United States Patent
Kagata et al.

(10) Patent No.: US 10,280,324 B2
(45) Date of Patent: May 7, 2019

(54) INK JET RECORDING METHOD AND METHOD OF CONTROLLING INK JET RECORDING APPARATUS

(71) Applicant: Seiko Epson Corporation, Tokyo (JP)

(72) Inventors: Takayoshi Kagata, Shiojiri (JP); Kenichi Seguchi, Okaya (JP); Akira Mizutani, Matsumoto (JP); Tsuyoshi Sano, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/915,457

(22) Filed: Mar. 8, 2018

(65) Prior Publication Data

US 2018/0281404 A1 Oct. 4, 2018

(30) Foreign Application Priority Data

Mar. 28, 2017 (JP) ................................. 2017-063117

(51) Int. Cl.
*B41J 2/14* (2006.01)
*C09D 11/322* (2014.01)
(Continued)

(52) U.S. Cl.
CPC ........... *C09D 11/322* (2013.01); *B41J 2/1433* (2013.01); *B41M 5/0011* (2013.01);
(Continued)

(58) Field of Classification Search
CPC ....... C09D 11/322; C09D 11/40; C09D 11/36; C09D 11/30; C09D 11/10; C09D 11/107; C09D 11/54; C09D 11/033; C09D 11/32; C09D 11/106; C09D 11/02; C09D 11/037; C09D 11/03; B41J 2/2107; B41J 2/01;
(Continued)

(56) References Cited

U.S. PATENT DOCUMENTS

| 2009/0232989 A1* | 9/2009 | Tojo ..................... C09D 11/326 427/256 |
| 2011/0050795 A1* | 3/2011 | Arai .................... C09B 67/0013 347/28 |

(Continued)

FOREIGN PATENT DOCUMENTS

| JP | 2013-035984 A | 2/2013 |
| JP | 2014-240181 A | 12/2014 |
| JP | 2017-110185 A | 6/2017 |

*Primary Examiner* — Jannelle M Lebron
(74) *Attorney, Agent, or Firm* — Harness, Dickey & Pierce, P.L.C.

(57) ABSTRACT

An ink jet recording method includes attaching an ink composition, with which a pressure chamber of an ink jet head is filled, to a recording medium by discharging the ink composition via a nozzle port, in which the ink jet head includes a step between the pressure chamber and the nozzle port, the ink composition contains water, a resin, and an organic solvent including at least a nitrogen-containing solvent, and the organic solvent includes an organic solvent, in which a difference in a SP value between the organic solvent and the resin is within 5, in a range of 0.1 part by mass to 0.4 parts by mass with respect to 1 part by mass of water, and does not include an organic solvent which has a standard boiling point of equal to higher than 280° C. and the content of more than 5% by mass in the ink composition.

18 Claims, 1 Drawing Sheet

(51) Int. Cl.
*B41M 5/00* (2006.01)
*C09D 11/033* (2014.01)
*C09D 11/037* (2014.01)
*C09D 11/36* (2014.01)
*C09D 11/107* (2014.01)
*C09D 11/106* (2014.01)
*C09D 11/54* (2014.01)

(52) U.S. Cl.
CPC ........ *B41M 5/0023* (2013.01); *B41M 5/0047* (2013.01); *C09D 11/033* (2013.01); *C09D 11/037* (2013.01); *C09D 11/106* (2013.01); *C09D 11/107* (2013.01); *C09D 11/36* (2013.01); *C09D 11/54* (2013.01); *B41J 2002/14475* (2013.01); *B41J 2202/03* (2013.01)

(58) Field of Classification Search
CPC ............ B41J 2/1433; B41J 2002/14475; B41J 2202/03; B41M 5/0023; B41M 5/0011; B41M 5/0047
USPC ............................ 347/9, 21, 84, 95, 96, 100
See application file for complete search history.

(56) References Cited

U.S. PATENT DOCUMENTS

2012/0320124 A1* 12/2012 Saito .................... C09D 11/326
 347/21
2013/0038664 A1   2/2013 Kagata et al.
2014/0340443 A1  11/2014 Katano et al.
2017/0166768 A1   6/2017 Matsuzaki et al.

* cited by examiner

INK JET RECORDING METHOD AND METHOD OF CONTROLLING INK JET RECORDING APPARATUS

BACKGROUND

1. Technical Field

The present invention relates to an ink jet recording method and a method of controlling an ink jet recording apparatus.

2. Related Art

An ink jet recording method of discharging minute ink droplets from an ink jet head nozzle of an ink jet recording apparatus so as to record an image on a recording medium has been known, and applications thereof in a sign printing field and a high-speed label printing field have been also considered. In addition, in a case where recording an image is performed on a recording medium having low ink absorbability (for example, art paper or coated paper) or a recording medium having non-ink absorbability (for example, a plastic film), using a water-based resin ink composition containing resin emulsion (hereinafter, also referred to as "water-based ink" or "ink") as ink has been considered from the viewpoint of global environment and human safety. Further, in a case where the recording is performed with the water-based resin ink composition, it is a problem to ensure compatibility between ensuring discharging reliability of ink and film forming properties (fixability) of an ink coated film attached to the surface of the recording medium.

Here, in order to prevent clogging of the ink jet head by drying and to ensure the discharging reliability of ink at the time of recording, it is necessary to add a high boiling point solvent to the water-based ink. However, when the high boiling point solvent is added to the ink, driability of the ink attached to the recording medium is deteriorated. Particularly, in the recording medium having non-ink absorbability, due to the deterioration in the driability of the ink, sufficient image quality and abrasion resistance may not be obtained. In this regard, when the nitrogen-containing solvent is contained in the ink, the resin contained in the water-based ink is dissolved on the recording medium so as to obtain the film forming properties of the ink coated film.

On the other hand, in order to enable high-resolution recording, a high-density head is used, and in order to increase the nozzle resolution of the ink jet head, it is effective to perform nozzle formation by etching. However, when the nozzle is formed by etching, a step structure is formed. When the step structure is formed in the nozzle, bubbles are likely to be entrapped in a nozzle hole at the time of discharging the ink, and thus the discharging reliability of the ink may be deteriorated in some cases. In this regard, in order to improve discharge from the nozzle including a step portion, a technique of adjusting the surface tension of a water-soluble organic solvent contained in the water-based ink is known (for example, refer to JP-A-2013-35984).

However, in the water-based ink as described above, an organic solvent such as a nitrogen-containing solvent contained in the ink causes dissolution and welding of a resin of the ink in the ink jet head, and in a case of the ink in which a high-boiling point solvent such as glycerin is not contained, water easily evaporates, and thus the dissolution and welding of the resin are likely to occur. Particularly, when a head including a step in a nozzle is used as an ink jet head, the bubbles tend to be attached to the step portion, and thus in a case where the bubbles are separated from the step during use of the head and moves to and retained in an upper pressure chamber, and the ink is not discharged, ink drying progresses on an air-liquid interface of bubbles, and the dissolution and welding of the resin are likely to occur. In addition, when the dissolution and welding of the resin occur, a phenomenon in which discharge failure is difficult to recover even when cleaning is performed occurs.

SUMMARY

An advantage of some aspects of the invention is to provide an ink jet recording method and a method of controlling an ink jet recording apparatus which can form an image excellent in abrasion resistance and excellent in discharging reliability in recording with an ink jet head including a step nozzle.

The invention can be realized in the following aspects or application examples.

Application Example 1

According to an aspect of the invention, there is provided an ink jet recording method including attaching an ink composition, with which a pressure chamber of an ink jet head is filled, to a recording medium by discharging the ink composition via a nozzle port, in which the ink jet head includes a step between the pressure chamber and the nozzle port, the ink composition contains water, a resin, and an organic solvent including at least a nitrogen-containing solvent, and the organic solvent includes an organic solvent, in which a difference in a SP value between the organic solvent and the resin is within 5, in a range of 0.1 part by mass to 0.4 parts by mass with respect to 1 part by mass of water, and does not include an organic solvent which has a standard boiling point of equal to higher than 280° C. and is more than 5% by mass in the ink composition.

According to the application example, when the difference in the SP value between the organic solvent including a nitrogen-containing solvent and the resin is set to be within 5, and the content thereof is set to be a predetermined value, in the recording with the ink jet head including a step nozzle, the film forming properties of the ink coated film become excellent, and thus it is possible to provide an ink jet recording method which is capable of forming an image excellent in the abrasion resistance, and is excellent in the discharging reliability.

Application Example 2

In the application example, as the nitrogen-containing solvent, 5% by mass or more of nitrogen-containing solvent in which a difference in the SP value between the resin and the nitrogen-containing solvent is within 3 may be contained in the ink composition.

According to the application example, when 5% by mass or more of nitrogen-containing solvent in which the difference in the SP value between the resin and the nitrogen-containing solvent is within 3 is contained in the ink composition, it is possible to provide an ink jet recording method which is capable of forming an image more excellent in the abrasion resistance, and is excellent in the discharging reliability.

Application Example 3

In the application example, it is preferable that a content of an organic solvent other than a nitrogen-containing solvent be equal to or greater than 5% by mass.

According to the application example, when the content of the organic solvent other than the nitrogen-containing solvent is equal to or greater than 5% by mass, it is possible to provide an ink jet recording method which is capable of forming an image more excellent in the abrasion resistance, and is excellent in the discharging reliability.

Application Example 4

In the application example, it is preferable that a total amount of an organic solvent in the ink composition be equal to or greater than 15% by mass.

According to the application example, when the total amount of the organic solvent in the ink composition is equal to or greater than 15% by mass, it is possible to provide an ink jet recording method which is capable of forming an image more excellent in the abrasion resistance, and is excellent in the discharging reliability.

Application Example 5

In the attaching of the ink composition, it is preferable that the ink composition be attached to the heated recording medium at the time of attaching the ink composition to the recording medium.

According to the application example, in the attaching of the ink composition, when the ink composition is attached to the heated recording medium at the time of attaching the ink composition to the recording medium, the driability of the ink composition on the recording medium is improved, and thus occurrence of bleeding is suppressed, the film forming properties of the ink coated film is more excellent, and thereby it is possible to form an image excellent in the abrasion resistance.

Application Example 6

In the application example, it is preferable that the recording medium be a recording medium having non-ink absorbability or a recording medium having low ink absorbability.

According to the application example, even in a case where the recording medium is a recording medium having non-ink absorbability or a recording medium having low ink absorbability, it is possible to provide an ink jet recording method in which the film forming properties of the ink coated film are excellent, an image excellent in the abrasion resistance can be formed, and the discharging reliability is excellent.

Application Example 7

In the application example, it is preferable that the nozzle port be formed on a nozzle formation plate formed of silicon single crystal.

According to the application example, when the nozzle port is formed by etching the nozzle formation plate made of silicon single crystal, a step is formed in the flow path through which the ink passes between the pressure chamber and the nozzle port, and as the ink composition stays in the step, the ink film accumulates, and landing deviation and clogging of the ink tend to occur during continuous printing; however, even with the ink jet head having such a structure, the accumulation of the ink film can be reduced in the step, and thus it is possible to provide an ink jet recording method which is excellent in the discharging reliability.

Application Example 8

In the application example, it is preferable that the nozzle port have a nozzle density of equal to or greater than 300 dpi, and discharge the ink composition by a piezo method.

According to the application example, even in a case where the nozzle port has a nozzle density of equal to or greater than 300 dpi, and discharges the ink composition by a piezo method, the accumulation of the ink film can be reduced, and thus it is possible to provide an ink jet recording method which is capable of forming an image more excellent in the abrasion resistance, and is excellent in the discharging reliability.

Application Example 9

In the application example, it is preferable that the step be within a range where a distance in a direction from the nozzle port to the pressure chamber is in a range of 20 μm to 100 μm.

According to the application example, even in a case where the step is formed on the nozzle formation plate, the accumulation of the ink film can be reduced, and thus it is possible to provide an ink jet recording method which is capable of forming an image more excellent in the abrasion resistance, and is excellent in the discharging reliability.

Application Example 10

According to another aspect of the invention, there is provided a method of controlling an ink jet recording apparatus to perform recording by the ink jet recording method according to any one of Application Example 1 to Application Example 9 for one hour or more without cleaning performed by discharging the ink composition from the ink jet head by an action from the outside of the ink jet head.

According to the application example, in the ink jet recording apparatus that performs recording by the ink jet recording method described in any one of Application Example 1 to Application Example 9, recovery such as suction cleaning and pressurized discharge is strong, but the recording can be performed for one or more hours without performing a cleaning step of interrupting the recording, and thus the ink jet recording in which an image excellent in the abrasion resistance can be formed can be performed for one or more hours.

BRIEF DESCRIPTION OF THE DRAWINGS

The invention will be described with reference to the accompanying drawings, wherein like numbers reference like elements.

DESCRIPTION OF EXEMPLARY EMBODIMENTS

Below, various embodiments of the invention will be described. The embodiments described below are for describing an example of the invention. In addition, the invention is not limited in any way by the following embodiments, and includes various modifications carried out in a range not departing from the gist of the invention.

An ink jet recording method according to the embodiment includes attaching an ink composition, with which a pressure chamber of an ink jet head is filled, to a recording medium by discharging the ink composition via a nozzle port, in which the ink jet head includes a step between the pressure chamber and the nozzle port, the ink composition contains water, a resin, and an organic solvent including at least a nitrogen-containing solvent, and the organic solvent includes an organic solvent, in which a difference in a SP value between the organic solvent and the resin is within 5, in a range of 0.1 part by mass to 0.4 parts by mass with respect to 1 part by mass of water, and does not include an organic solvent which has a standard boiling point of equal to higher than 280° C. and the content of more than 5% by mass in the ink composition.

Hereinafter, regarding the ink jet recording method according to the embodiment, an ink jet recording apparatus which performs recording by using this recording method, an ink composition (hereinafter, also referred to as "ink"), a treating liquid, a recording medium, and an ink jet recording method will be described in this order).

1. Configurations

1.1. Ink Jet Recording Apparatus

An example of an ink jet recording apparatus in which a recording method according to the embodiment is executed will be described with reference to the drawings. Note that, the ink jet recording apparatus that can be used for the recording method according to the embodiment is not limited to the following examples.

Figure 1:
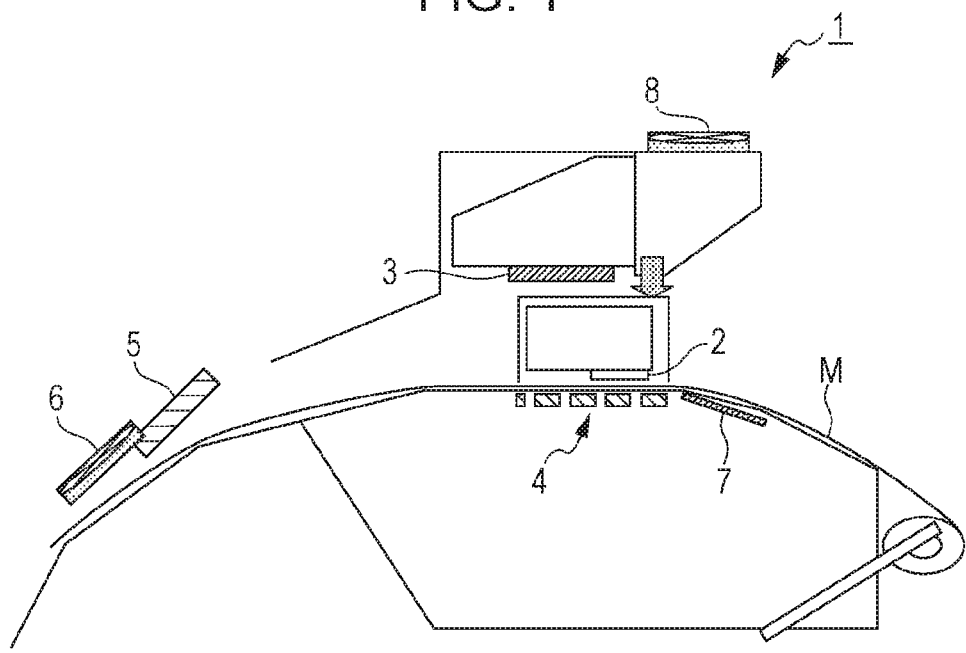
FIG. 1 is a schematic sectional view schematically illustrating an ink jet recording apparatus.

An example of an ink jet recording apparatus which can be used as an ink jet recording apparatus used in the embodiment will be described with reference to the drawings. FIG. 1 is a schematic sectional view schematically illustrating an ink jet recording apparatus. As illustrated in FIG. 1, an ink jet recording apparatus 1 is provided with an ink jet head 2, an IR heater 3, a platen heater 4, a hardening heater 5, a cooling fan 6, a preheater 7, and a ventilation fan 8. The ink jet recording apparatus 1 is provided a control unit (not shown), and an operation of the entire ink jet recording apparatus 1 is controlled by the control unit.

Figure 2:
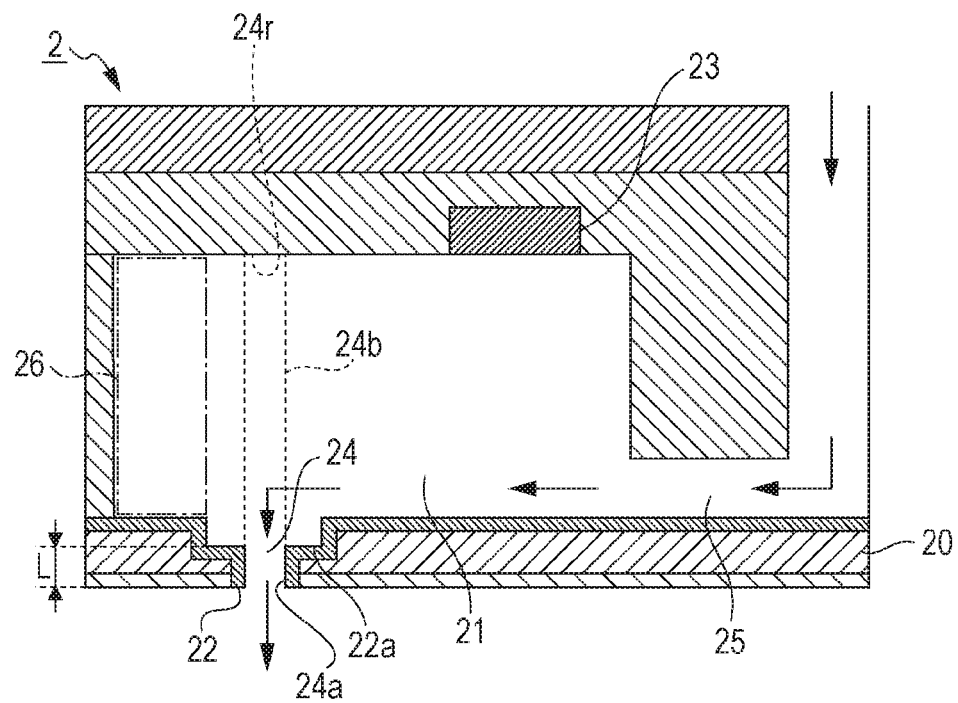
FIG. 2 is a schematic sectional view schematically illustrating a structure of an ink jet head as illustrated in FIG. 1.

The ink jet head 2 is a unit that discharges and attaches the ink composition to the recording medium M, and for example, ones having the type illustrated in in FIG. 2 can be used.

The ink jet head 2 is provided with a nozzle 22 for discharging an ink composition. The ink is discharged toward the recording medium M from the nozzle port 24a which is a tip end portion of the nozzle. Examples of a method of discharging ink from a nozzle include a method of applying a strong electric field between a nozzle and an accelerating electrode placed in front of the nozzle to continuously discharge droplet-like ink from the nozzle, and discharging the ink corresponding to a recording information signal while the ink droplet flies between deflecting electrodes (an electrostatic suction method); a method of applying pressure to ink with a small pump and mechanically vibrating the nozzle with a crystal oscillator or the like so as to forcibly discharge the ink droplet; a method of applying a pressure and a recording information signal to ink at the same time with a piezoelectric element so as to discharge the ink droplet and perform recording (a piezo method); and a method of heating and foaming ink with a microelectrode in accordance with a recording information signal so as to discharge the ink droplet and perform recording (a thermal jet method).

As the ink jet head 2, any of a line type ink jet head and a serial type ink jet head can be used.

Here, the ink jet recording apparatus which is provided with the serial type ink jet head performs recording by performing scanning (passing) for discharging the ink composition while moving the ink jet head for recording relative to the recording medium a plurality of times. Specific examples of the serial type ink jet head include an ink jet head which is mounted on a carriage which moves in the width direction of the recording medium (the direction interacting with the transport direction of the recording medium), and is moved as the carriage moves so as to discharge liquid droplets onto the recording medium.

On the other hand, ink jet recording apparatus provided with the line type ink jet head performs recording by performing scanning (passing) for discharging the ink composition while moving the ink jet head for recording relative to the recording medium once. Specific examples of the line type ink jet head include an ink jet head which is formed to be wider than the width of the recording medium and discharges liquid droplets onto the recording medium without moving the recording head.

In the embodiment, as the ink jet recording apparatus 1, the ink jet recording apparatus provided with the serial type ink jet head is used, and the ink jet head 2 (which uses the piezo method as a method of discharging ink from the nozzle) is used.

FIG. 2 is a schematic sectional view schematically illustrating a structure of the ink jet head 2. In FIG. 2, the arrow indicates the movement direction of the ink in the ink jet head 2. The ink jet head 2 is provided with a pressure chamber 21 and a piezoelectric element 23 which discharges the ink composition from the nozzle 22 by applying the pressure to the pressure chamber 21. In the pressure chamber 21, a piezoelectric element 23 is disposed at a position other than a position 24r facing an outflow port 24 communicating with the nozzle 22. In a case where the piezoelectric element 23 is provided immediately above the nozzle 22, an extrusion force of the ink from the piezoelectric element 23 is also directly transmitted to the ink film attached to a nozzle port 24a, and thus it is possible to eliminate the attachment of the ink film; whereas in a case where the piezoelectric element 23 is not provided immediately above the nozzle 22, it is difficult to eliminate the attachment of the ink film, and thus the ink jet recording method according to the embodiment is useful.

Here, the position 24r facing the outflow port 24 which communicates with the nozzle 22 in the pressure chamber 21 means a position immediately above the nozzle 22, and in FIG. 2, if a line (which is indicated as a broken line in FIG. 2) is extended from the nozzle port 24a to the upper side in FIG. 2), the position 24r means an area surrounded by an extension line 24b and an extension line 24b. For example, in the case of the ink jet head 2 in FIG. 2, regarding the outflow port 24, the outflow port 24 is not a part which is widened in the middle, but is a part in which an area in the direction orthogonal to the direction to which the ink is discharged is the same as that of the nozzle 22. Accordingly, the fact that the piezoelectric element 23 is disposed at a position other than the opposing position 24r means that at least a part of the piezoelectric element 23 is not positioned the position 24r facing this position. The piezoelectric element 23 may be disposed in a place other than the upper surface of the pressure chamber 21, or may be disposed on the side surface of the pressure chamber 21, for example.

The pressure chamber 21 includes a retention portion 26 in which ink is retained in the direction extending from the ink movement direction connecting a supply port 25 through which ink is supplied to the pressure chamber 21, and to the outflow port 24 of the pressure chamber 21. The retention portion 26 is a portion formed in a step of mass producing the ink jet head 2, and thus it is difficult to mass-produce an ink jet head provided with the pressure chamber 21 without the retention portion 26. In this retention portion 26, the ink composition is likely to stagnate and an ink dried matter (a resin welded deposited matter) is likely to accumulate. When bubbles are collected so as to create a space, the ink dried matter is attached to the wall surface. On the other hand, according to the ink jet recording method in the embodiment, even with the ink jet head 2 having such a structure, accumulation of the ink dried matters can be reduced in the retention portion 26, and it is possible to provide an ink jet recording method excellent in the ink discharging reliability.

The nozzle 22 is formed in the nozzle formation plate 20 made of silicon single crystal having a plane orientation (110). In a case where the nozzle formation plate 20 is made of the silicon crystal, it is possible to perform accurate processing by a known etching process (for example, wet etching or dry etching), and the nozzle 22 is often formed by a combination of these processes. Therefore, when the nozzle formation plate 20 made of silicon crystal is used, the nozzle can be formed with a high density of nozzle density of 300 dpi or more, compared with the case of forming the nozzle by punching or the like. Note that, the nozzle density is further preferably equal to or greater than 360 dpi.

On the other hand, if the nozzle is formed by etching, the step 22a is likely to be formed in a flow path through which ink passes from the pressure chamber 21 to the nozzle port 24a. Since this step 22a is formed by etching a silicon layer, it is difficult to form the nozzle formation plate 20 with which the step 22a is eliminated. The step 22a may be between the outflow port 24 and the nozzle port 24a of the pressure chamber 21, and for example, the step 22a is formed in a range of 20 µm to 100 µm in which the distance (L in FIG. 2) of the direction toward from the nozzle port 24a to the pressure chamber 21. In other words, in FIG. 2, the step 22a is formed by forming portions having different diameters of the nozzles 22 in the thickness direction of the nozzle formation plate 20; however, the step 22a is not necessarily formed on the nozzle formation plate 20, but may be formed such that a step can be formed on the inside surface of the pressure chamber 21.

In the ink jet head 2 including such a step 22a, the bubbles may be attached to remain on the step 22a during initial filling or cleaning of the ink, and the bubbles are floated from the step 22a during recording and are collected above the pressure chamber 21, and here, a gas-liquid interface is generated to dry the ink, and thereby an ink dried matter (resin welded matter) is attached to the inside of the ink jet head 2, particularly, the step 22a and the retention portion 26. On the other hand, according to the ink jet recording method in the embodiment, even in the case of having the step 22a, the accumulation of the ink dried matter in the ink jet head 2 can be reduced in the step, and thus it is possible to provide an ink jet recording method excellent in the ink discharging reliability.

In the embodiment, a plurality of the pressure chamber 21, discharge driving units (not shown), and the nozzles 22 provided for each of the pressure chamber 21 of the ink jet head 2 each may be independently provided on one head. Here, discharge driving unit can be formed by using an electromechanical conversion element such as a piezoelectric element 23 for changing the volume of the pressure chamber 21 by mechanical deformation, and an electrothermal conversion element for emitting heat so as to generate and discharge bubbles to the ink.

Returning to FIG. 1, the ink jet recording apparatus 1 includes the IR heater 3 and the platen heater 4 for heating the recording medium M at the time of discharging the ink composition from the ink jet head 2. In the embodiment, when the recording medium M is heated in the attaching step of the ink composition, at least one of the IR heater 3 and the platen heater 4 may be used.

Note that, when the IR heater 3 is used, it is possible to heat the recording medium M from the ink jet head 2 side. With this, the ink jet head 2 is likely to be heated at the same time, but as compared with the case of heating the rear surface of the recording medium M by the platen heater 4, it is possible to raise the temperature without being affected by the thickness of the recording medium M. Further, when the platen heater 4 is used at that time of heating the recording medium M, it is possible to heat the recording medium M from the side opposite to the ink jet head 2 side. With this, the ink jet head 2 is relatively less likely to be heated. Here, the surface temperature of the recording medium M by the IR heater 3 or the platen heater 4 is preferably in a range of 25° C. to 60° C., is further preferably in a range of 30° C. to 50° C. and is still further preferably in a range of 35° C. to 45° C. With this, the radiation heat received from the IR heater 3 and the platen heater 4 is reduced or eliminated, and thus drying of the ink composition and composition variation thereof in the ink jet head 2 can be suppressed, and welding of the resin to the inner wall of the ink jet head 2 can be reduced.

The hardening heater 5 is for drying and solidifying the ink composition recorded on the recording medium M. When the hardening heater 5 heats the recording medium M on which the image is recorded, the moisture contained in the ink composition more rapidly evaporates and the ink film is formed by the resin fine particles contained in the ink composition. In this way, the ink film firmly fixes (attaches) to the recording medium M, and thus it is possible to obtain a high-quality image excellent in the film forming properties in a short time. The drying temperature by the hardening heater 5 is preferably in a range of 40° C. to 120° C., is further preferably in a range of 60° C. to 100° C., and is still further preferably in a range of 80° C. to 90° C.

The ink jet recording apparatus 1 may include a cooling fan 6. After drying the ink composition recorded on the recording medium M, the ink composition on the recording medium M is cooled by the cooling fan 6 so that an ink coated film can be formed on the recording medium M with good adhesion.

In addition, the ink jet recording apparatus 1 may include a preheater 7 for previously heating (preheating) a recording medium M before discharging the ink composition on the recording medium M. Further, the recording apparatus 1 may include a ventilation fan 8 such that the ink composition attached on the recording medium M is more efficiently dried.

1.2. Ink Composition

Next, the ink composition used in the ink jet recording method according to the embodiment will be described. The ink composition used in the embodiment contains water, a resin, and an organic solvent including at least a nitrogen-containing solvent, and the organic solvent includes the organic solvent in which a difference in the SP value between the organic solvent and the resin is within 5 in a range of 0.1 part by mass to 0.4 parts by mass with respect to 1 part by mass of water, and does not include an organic solvent which has a standard boiling point of equal to higher than 280° C. and the content of more than 5% by mass in the ink composition. In such an ink composition, when the difference in the SP value between the organic solvent including a nitrogen-containing solvent and the resin is set to be within 5, and the content thereof is set to be a predetermined value, in the recording with the ink jet head including a step nozzle, the film forming properties of the ink coated film become excellent, and thus it is possible to provide an ink jet recording method which is capable of forming an image excellent in the abrasion resistance, and is excellent in the discharging reliability. Particularly, the ink jet recording method can be preferably used for the recording medium having non-ink absorbability or low ink absorbability. Hereinafter, components contained in the ink composition used in the embodiment will be described.

1.2.1. Coloring material

The ink composition used in the embodiment may contain a coloring material. Examples of the coloring material include dyes and pigments, and the pigment has a property of being resistant to discoloration against light, gas, and the like, and thus is preferably used. For this reason, an image formed on a recording medium having ink non-ink absorbability or ink low ink absorbability using a pigment is excellent in water resistance, gas resistance, light resistance, and the like, and has excellent storage stability.

The pigments which can be used in the embodiment are not particularly limited, and examples thereof include an inorganic pigment and an organic pigment. Examples of the inorganic pigment include titanium oxide, iron oxide, and carbon black manufactured by a known method such as a contact method, a furnace method, and a thermal method. On the other hand, examples of the organic pigment include an azo pigment (such as azolake, an insoluble azo pigment, a condensed azo pigment, and a chelate azo pigment), a polycyclic pigment (such as a phthalocyanine pigment, a perylene pigment, a perinone pigment, an anthraquinone pigment, and a quinophthalone pigment), a nitro pigment, a nitroso pigment, and aniline black.

Among the specific examples of the pigments which are can be used in the embodiment, carbon black is exemplified as a black pigment. The carbon black not particularly limited, and examples thereof include Furnace Black, Lamp Black, Acetylene Black, and Channel Black (C.I. Pigment Black 7), and commercially available products such as No. 2300, 900, MCF88, No. 20B, No. 33, No. 40, No. 45, No. 52, MA7, MA8, MA77, MA100, and No. 2200B (which are manufactured by Mitsubishi Chemical Corporation), Color Blacks FW1, FW2, FW2V, FW18, FW200, 5150, 5160, 5170, Printexs 35, U, V, and 140U, Special Blacks 6, 5, 4A, 4, and 250 (which are manufactured by Evonik Degussa Gmbh), Conductex SC, Ravens 1255, 5750, 5250, 5000, 3500, 1255, and 700 (which are manufactured by Columbia), Regals 400R, 330R, and 660R, Mogul L, Monarchs 700, 800, 880, 900, 1000, 1100, 1300, and 1400, and Elftex 12 (which are manufactured by Cabot Corporation).

The white pigment is not particularly limited, and examples thereof include C.I. Pigment Whites 6, 18, and 21, a white inorganic pigment of titanium oxide, zinc oxide, zinc sulfide, antimony oxide, magnesium oxide, and zirconium oxide. In addition to the white inorganic pigment, a white organic pigment such as white hollow resin particles and polymer particles can be used.

A pigment used for the yellow ink is not particularly limited, and examples thereof include C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

A pigment used for the magenta ink is not particularly limited, examples thereof include C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violets 19, 23, 32, 33, 36, 38, 43, and 50.

A pigment used for the cyan ink is not particularly limited, and examples thereof include C.I. Pigment Blues 1, 2, 3, 15, 15:1, 15:2, 15:3, 15:34, 15: 4, 16, 18, 22, 25, 60, 65, and 66, and C.I. Bad Blues 4 and 60.

A pigment used for color ink other than magenta, cyan, and yellow is not particularly limited, and examples thereof include C.I. Pigment Greens 7 and 10, C.I. Pigment Brown 3, 5, 25, and 26, C.I. Pigment Orange 1, 2, 5, 7, 13, 14, 15, 16, 24, 34, 36, 38, 40, 43, and 63.

A pearl pigment is not particularly limited, and examples thereof include a pigment having pearly luster and interference gloss such as titanium dioxide-coated mica, fish scale foil, and bismuth oxychloride.

A metallic pigment is not particularly limited, but examples thereof include particles made of a monomer such as aluminum, silver, gold, platinum, nickel, chromium, tin, zinc, indium, titanium, and copper, or an alloy thereof.

The content of the coloring material contained in the ink composition is preferably in a range of 1.5% by mass to 10% by mass, and is further preferably in a range of 2% by mass to 7% by mass, with respect to the total mass (100% by mass) of the ink composition.

In order to apply the pigment to the ink composition, it is necessary to stably disperse and retain the pigment in water. Examples of the method thereof include a method of dispersing a pigment with a resin dispersant such as a water-soluble and/or a water dispersible resin (hereinafter, a pigment which is dispersed by this method is referred to as a "resin dispersed pigment"), a method of dispersing a pigment with a surfactant of a water-soluble surfactant and/or a water-dispersible surfactant (hereinafter, a pigment which is dispersed by this method is referred to as a "surfactant dispersed pigment"), and a method of dispersing and/or dissolving a pigment in water without a dispersant such as the above-mentioned resin or surfactant by chemically and physically introducing a hydrophilic functional group to a pigment particle surface (hereinafter, a pigment which is dispersed by this method is referred to as a "surface treated pigment"). In the embodiment, as the ink composition, any of a resin dispersed pigment, a surfactant dispersed pigment, and a surface treated pigment can be used, and it is also possible to use a mixture of plural kinds of pigments as necessary.

Examples of the resin dispersant used in the resin dispersed pigment include polyvinyl alcohols, a polyvinyl pyrrolidones, a polyacrylic acid, an acrylic acid-acrylonitrile copolymer, a vinyl acetate-acrylate copolymer, an acrylic acid-acrylate copolymer, a styrene-acrylic acid copolymer, a styrene-methacrylic acid copolymer, a styrene-methacrylic acid-acrylate copolymer, a styrene-α-methylstyrene-acrylic acid copolymer, a styrene-α-methylstyrene-acrylic acid-acrylate copolymer, a styrene-maleic acid copolymer, a styrene-maleic anhydride copolymer, a vinyl naphthalene-acrylic acid copolymer, a vinyl naphthalene-maleic acid copolymer, a vinyl acetate-maleic acid ester copolymer, a vinyl acetate-crotonic acid copolymer, and a vinyl acetate-acrylic acid copolymer, and salts thereof. Among them, a copolymer of a monomer having a hydrophobic functional group and a monomer having a hydrophilic functional group, and a polymer consisting of a monomer having both of the hydrophobic functional group and the hydrophilic functional group are particularly preferable. As a form of the copolymer, any of a random copolymer, a block copolymer, an alternating copolymer, and a graft copolymer can be used.

Examples of the salt include a basic compound such as ammonia, ethylamine, diethylamine, triethylamine, propylamine, isopropylamine, dipropylamine, butylamine, isobutylamine, diethanolamine, triethanolamine, tri-iso-propanolamine, aminomethyl propanol, and morpholine, and a salt. The additional amount of these basic compounds is not particularly limited as long as it is not less than the neutralization equivalent of the resin dispersant.

A molecular weight of the resin dispersant as a weight average molecular weight is preferably in a range of 1,000 to 100,000, and is further preferably in a range of 3,000 to 10,000. When the molecular weight is within the above range, stable dispersion of the coloring material can be obtained in water and it is easy to perform viscosity control when the coloring material is applied to the ink composition.

A commercially available product can also be used as the above-described resin dispersant. Specifically, examples thereof include JONCRYL 67 (weight average molecular weight: 12,500, acid value: 213), JONCRYL 678 (weight average molecular weight: 8,500, acid value: 215), JONCRYL 586 (weight average molecular weight: 4,600, acid value: 108), JONCRYL 611 (weight average molecular weight: 8,100, acid value: 53), JONCRYL 680 (weight average molecular weight: 4,900, acid value: 215), JONCRYL 682 (weight average molecular weight: 1,700, acid value: 238), JONCRYL 683 (weight average molecular weight: 8,000, acid value: 160), and JONCRYL 690 (weight average molecular weight: 16,500, acid value: 240) (product names, manufactured by BASF Japan Ltd).

Examples of the surfactant used for the surfactant dispersed pigment include an anionic surfactant such as alkane-sulfonate, α-olefin sulfonate, alkyl benzene sulfonate, alkyl naphthalene sulfonate, acyl methyl taurate, dialkyl sulfosuccinate, alkyl sulfate ester salt, sulfated olefin, polyoxyethylene alkyl ether sulfate ester salt, alkyl phosphate ester salt, polyoxyethylene alkyl ether phosphoric acid ester salt, and monoglycerite phosphate ester salt; an amphoteric surfactant such as alkyl pyridium salt, alkyl amino acid salt, and alkyl dimethyl betaine; and a nonionic surfactant, polyoxyethylene alkyl ether, polyoxyethylene alkyl phenyl ether, polyoxyethylene alkyl ester, polyoxyethylene alkyl amide, glycerin alkyl ester, and sorbitan alkyl ester.

The additional amount of the pigment of the resin dispersant or the surfactant is preferably in a range of 1 part by mass to 100 parts by mass, is further preferably in a range of 5 parts by mass to 50 parts by mass, with respect to 100 parts by mass of pigment. When the additional amount is within the above range, it is possible to secure the dispersion stability of the pigment in water.

In addition, as the surface treated pigment, a hydrophilic functional group is exemplified and examples thereof include —OM, —COOM, —CO—, —SO3M, —SO2NH3, —RSO3M, —PO3HM, —PO3M3, —SO3NHCOR, —NH3, and —NR3 (here, in the formula, M represents a hydrogen atom, an alkali metal, an ammonium, or an organic ammonium, R represents an alkyl group having 1 to 12 carbon atoms, a phenyl group which may have a substituent, or a naphthyl group which may have a substituent). These functional groups are introduced physically and/or chemically by being grafted to the pigment particle surface directly and/or via other groups. Examples of the polyvalent group include an alkylene group having 1 to 12 carbon atoms, a phenylene group which may have a substituent, or a naphthylene group which may have a substituent.

In addition, preferable examples of the surface treated pigment include a pigment which is surface-treated such that —SO3M and/or —RSO3M (M is a counter ion, and represents a hydrogen ion, an alkali metal ion, an ammonium ion, or an organic ammonium ion) is chemically bonded to the pigment particle surface by a treating agent containing sulfur, that is, a pigment which is dispersed in a solvent having no active protons, no reactivity with a sulfonic acid, and in which the pigment is insoluble or hardly soluble, then is surface-treated such that —SO3M and/or —RSO3M is chemically bonded to the particle surface by an amidosulfuric acid or a complex of sulfur trioxide and a tertiary amine, and thus can be dispersed and/or dissolved in water.

As a surface treatment unit that grafts the functional group or the salt thereof on the surface of the pigment particle directly or via a polyvalent group, various known surface treatment units can be applied. Examples thereof include a unit that causes ozone or a sodium hypochlorite solution to act on commercially available oxidized carbon black, and further oxidizes the carbon black so as to treat the surface more hydrophilic (for example, JP-A-7-258578, JP-A-8-3498, JP-A-10-120958, JP-A-10-195331, JP-A-10-237349), a unit that treats carbon black with 3-amino-N-alkyl substituted pyridium bromide (for example, JP-A-10-195360 and JP-A-10-330665), a unit for dispersing an organic pigment in a solvent in which the organic pigment is insoluble or poorly soluble and introducing a sulfone group into the pigment particle surface with a sulfonating agent (for example, JP-A-8-283596, JP-A-10-110110, and JP-A-10-110111), and a unit for dispersing an organic pigment in a basic solvent which forms a complex with sulfur trioxide, treating the surface of the organic pigment by adding sulfur trioxide, and introducing a sulfone group or sulfonamino group (for example, JP-A-10-110114); however, units for preparing the surface treated pigment used in the invention is not limited thereto.

The functional group to be grafted to one pigment particle may be single or plural. The kind and degree of the grafted functional group may be appropriately determined in consideration of dispersion stability in the ink, color density, dryability on the front surface of the ink jet head, and the like.

The method of dispersing the resin dispersed pigment, the surfactant dispersed pigment, and the surface treated pigment in water can be performed by adding a pigment, water, and a resin dispersant as the resin dispersed pigment, adding a pigment, water, and a surfactant as the surfactant dispersed pigment, adding a surface treated pigment and water as the surface treated pigment, and adding a water-soluble organic solvent or a neutralizing agent to each of the pigments as necessary, with a conventionally used dispersing machine such as a ball mill, a sand mill, an attritor mill, a roll mill, an agitator mill, a Henschel mixer, a colloid mill, an ultrasonic homogenizer, and a jet mill. In this case, from the viewpoint of securing the dispersion stability of the pigment in water, it is preferable that the resin dispersed pigment is dispersed such that a particle diameter of the pigment is in a range of 20 nm to 500 nm, and is further preferably in a range of 50 nm to 200 nm at an average particle diameter.

1.2.2. Resin

In the embodiment, the ink composition may contain a water-dispersible resin. The aforementioned resin has a function of solidifying ink and firmly fixing the ink solidified on the recording medium. A resin which is hardly soluble or insoluble in a liquid medium of the ink composition used in the embodiment can be dispersed in the form of fine particles (that is, in an emulsion state or a suspension state) so as to be contained in the aforementioned resin.

In addition, the resin used in the embodiment is a resin in which a difference in a SP value between an organic solvent including a nitrogen-containing solvent described later and the resin is equal to or less than 5. As a resin, when the resin in which the difference in the SP value between the organic solvent including a nitrogen-containing solvent and the resin is equal to or less than 5, the film forming properties of the ink coated film on the recording medium becomes excellent, and thereby it is possible to form an image excellent in the abrasion resistance.

In the specification, "SP value" can be referred to as a compatibilization parameter or as a solubility parameter. It means a value calculated using the Hansen equation as described below. The solubility parameter of Hansen is obtained by dividing the solubility parameter introduced by Hildebrand into three components of a dispersion term $\delta d$, a polar term $\delta p$, and a hydrogen bonding term $\delta h$, and representing the three components in a three-dimensional space. In the specification, the SP value is represented by $\delta[(cal/cm^3)\ 0.5]$, and a value calculated by using the following equation.

$$\delta[(cal/cm^3)0.5]]+(\delta d2+\delta p2+\delta h2)0.5$$

Note that, the dispersion term $\delta d$, a polar term $\delta p$, and a hydrogen bonding term $\delta h$ are required by Hansen and his successors of the research, and are listed in VII-698 to 711 of the Polymer Handbook (fourth edition), for example. Also, the solubility parameters of Hansen relating to many solvents and resins have been investigated and these solubility parameters are described, for example, in the Industrial Solvents Handbook (Wesley L. Archer).

Examples of the above-described resin include, in addition to the resin used as the above-described resin dispersant, polyacrylic acid ester or a copolymer thereof, polymethacrylic acid ester or a copolymer thereof, polyacrylonitrile or a copolymer thereof, polycyanoacrylate, polyacrylamide, polyacrylic acid, polymethacrylic acid, polyethylene, polypropylene, polybutene, polyisobutylene, polystyrene or a copolymer thereof, a petroleum resin, a chroman indene resin, a terpene resin, polyvinyl acetate or a copolymer thereof, polyvinyl alcohol, polyvinyl acetal, polyvinyl ether, polyvinyl chloride, or a copolymer thereof, polyvinylidene chloride, fluororesin, fluororubber, polyvinylcarbazole, polyvinylpyrrolidone or a copolymer thereof, polyvinyl pyridine, polyvinyl imidazole, polybutadiene or a copolymer thereof, polychloroprene, polyisoprene, and a natural resin. Among them, those having both a hydrophobic portion and a hydrophilic portion in the molecular structure are particularly preferable.

In order to obtain the above-described resin in a fine particle state, the following method can be used. Any of these methods may be used, and a plurality of methods may be combined as necessary. Examples of the method include a method of mixing a polymerization catalyst (a polymerization initiator) and a dispersant in a monomer constituting a desired resin, and polymerizing (that is, emulsion polymerization), a method of dissolving a resin having a hydrophilic portion in a water-soluble organic solvent, then mixing the solution in water, and then removing the water-soluble organic solvent by distillation or the like, and a method of dissolving a resin in a water-insoluble organic solvent, and mixing the solution with an dispersant in an aqueous solution. The above methods can be appropriately selected depending on the kind and properties of the resin to be used. The dispersant that can be used for dispersing the resin is not particularly limited, and examples thereof include an anionic surfactant (for example, dodecylbenzene sulfonic acid sodium salt, lauryl phosphate sodium salt, and polyoxyethylene alkyl ether sulfate ammonium salt), a nonionic surfactant (for example, polyoxyethylene alkyl ether, polyoxyethylene alkyl ester, polyoxyethylene sorbitan fatty acid ester, and polyoxyethylene alkyl phenyl ether). These can be used alone or two or more kinds thereof can be used in combination.

In a case where the above-described resin is used in a fine particle state (an emulsion form and a suspension form), it is also possible to use those obtained by known materials and methods. For example, the resins disclosed in JP-A-62-1426, JP-A-3-56573, JP-A-3-79678, JP-A-3-160068, and JP-A-4-18462 may be used. In addition, examples of commercially available product thereof include Micro Gel E-1002 and Micro Gel E-5002 (product name, prepared by Nippon Paint Co., Ltd.), BONCOAT 4001 and BONCOAT 5454 (product name, prepared by DIC Corporation), SAE1014 (product name, prepared by ZEON Corporation), SAIBINOL SK-200 (product name, prepared by Saiden Chemical Industry Co., Ltd.), JURYMER AT-613 (product name, prepared by Toagosei Co., Ltd.), VINYBRAN 700 (product name, prepared by Nissin Chemical Industry Co., Ltd), JONCRYL 7100, JONCRYL 390, JONCRYL 711, JONCRYL 511, JONCRYL 7001, JONCRYL 632, JONCRYL 741, JONCRYL 450, JONCRYL 840, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780, and JONCRYL 7610 (product name, prepared by BASF JAPAN LTD).

In a case where the resin is used in the fine particle state, from the viewpoint of securing the storage stability and the discharging reliability of the ink composition, the average particle diameter is preferably in a range of 5 nm to 400 nm, is further preferably in a range of 50 nm to 200 nm. When the average particle diameter of the resin fine particles is within the above-described range, the film formability becomes excellent, and large agglomerates are difficult to form even the resin fine particles agglomerate, and thus the nozzle clogging can be reduced. The average particle diameter in this specification is on a volume basis unless otherwise specified. As a measuring method, for example, it can be measured by a particle size distribution measuring apparatus using dynamic light scattering theory as a measurement principle. Examples of such a particle size distribution measuring apparatus include "Microtrac UPA" manufactured by Nikkiso Co., Ltd.

A glass transition temperature (Tg) of the resin is preferably, for example, in a range of −20° C. to 100° C., is further preferably in a range of −10° C. to 80° C., and is still further preferably in a range of 0° C. to 76° C.

The content of the resin is preferably, in terms of the solid content, in a range of 0.1% by mass to 15% by mass, is further preferably in a range of 0.5% by mass to 10% by mass, is still preferably in a range of 2% by mass to 7% by mass, and is particularly preferably in a range of 3% by mass to 5% by mass, with respect to the total mass of the ink composition. When the content is within the above range, it is possible to solidify and fix the ink composition even on the recording medium having low or non-ink absorbability.

1.2.3. Organic Solvent

In the embodiment, the ink composition contains an organic solvent including at least a nitrogen-containing solvent, and the organic solvent includes the organic solvent in which a difference in the SP value between the organic solvent and the resin is within 5 in a range of 0.1 part by mass to 0.4 parts by mass with respect to 1 part by mass of water, and does not include an organic solvent which has a standard boiling point of equal to higher than 280° C. and the content of more than 5% by mass in the ink composition.

In the embodiment, when the ink composition contains the organic solvent which includes a nitrogen-containing solvent and has a difference in the SP value between the organic solvent and the resin is within 5, the resin contained in the ink composition is dissolved on the recording medium. With this, it is possible to obtain the film forming properties of the ink coated film on the recording medium. Note that, when the organic solvent includes the nitrogen-containing solvent, the dissolution and welding of the resin in the ink jet head including the step nozzle, and in a case of the ink composition in which a high-boiling solvent such as glycerin is not contained, water easily evaporates, and thus the dissolution and welding of the resin are likely to occur. However, by setting the content of the organic solvent including the nitrogen-containing solvent to a predetermined value, the ink composition used in the present embodiment, in the recording with the ink jet head including a step nozzle, the film forming properties of the ink coated film become excellent, and thus it is possible to provide an ink jet recording method which is capable of forming an image excellent in the abrasion resistance, and is excellent in the discharging reliability.

As the nitrogen-containing solvent, more specific examples of the nitrogen-containing solvent include N-methyl-2-pyrrolidone (NMP; SP value of 11.2), N-ethyl-2-pyrrolidone, N-vinyl-2-pyrrolidone, 2-pyrrolidone (SP value of 11.5), N-butyl-2-pyrrolidone, and 5-methyl-2-pyrrolidone. The nitrogen-containing solvent acts as a good dissolving agent for the resin contained in the ink. Further, when the ink composition contains the nitrogen-containing solvent, the ink composition is attached to the recording medium, at the time of drying the recording medium proceeds, the components such as a resin contained in the ink are present in the vicinity due to the concentrated nitrogen-containing solvent, and thereby it is possible to dissolve the components rapidly and to improve the fixability to the recording medium.

The nitrogen-containing solvent in which the difference in the SP value between the resin and the nitrogen-containing solvent is within 3 is preferably equal to or greater than 5% by mass, is further preferably equal to or greater than 10% by mass, is still further preferably equal to or greater than 15% by mass, and is particularly preferably equal to or greater than 20% by mass, in the ink composition. When the nitrogen-containing solvent in which the difference in the SP value between the resin and the nitrogen-containing solvent is within 3 is equal to or greater than 5% by mass in the ink composition, it is possible to form an image which is more excellent in the film forming properties of the ink coated film, and is excellent in the abrasion resistance.

As the organic solvent used for the ink composition, the content of the organic solvent other than the above-described nitrogen-containing solvent is preferably equal to or greater than 5% by mass, and the organic solvent which has a standard boiling point of equal to higher than 280° C. and the content of more than 5% by mass in the ink composition is not included. The organic solvent other than the nitrogen-containing solvent is preferably a water-soluble organic solvent. By using the water-soluble organic solvent, the ink composition has better dryability and an image excellent in the abrasion resistance can be obtained.

Examples of the water-soluble organic solvent other than the nitrogen-containing solvent are not limited as long as the organic solvent in which a difference in the SP value between the organic solvent and the resin is adjusted to be within 5 in a range of 0.1 part by mass to 0.4 parts by mass with respect to 1 part by mass of water, and does not include an organic solvent which has a standard boiling point of equal to higher than 280° C. and the content of more than 5% by mass in the ink composition. Examples of the water-soluble organic solvent other than the nitrogen-containing solvent include alcohols such as methanol, ethanol and isopropyl alcohol; ketones or ketoalcohols such as acetone and diacetone alcohol; ethers such as tetrahydrofuran and dioxane; glycols such as hexane diol, ethylene glycol, diethylene glycol, triethylene glycol, polyethylene glycol, propylene glycol, dipropylene glycol, tripropylene glycol, polypropylene glycol, propanediol, butanediol, and pentanediol; lower alkyl ethers of glycols such as ethylene glycol monomethyl ether, diethylene glycol monomethyl ether, diethylene glycol monoethyl ether and diethylene glycol monobutyl ether; amines having a hydroxyl group such as diethanolamine and triethanolamine; and glycerin. In the recording with the ink jet head including the step nozzle, the dissolution and welding of the resin are less likely to occur in the pressure chamber, and the film forming properties of the ink coated film become excellent, and thus it is possible to provide an ink jet recording method which is capable of forming an image excellent in the abrasion resistance, and is excellent in the discharging reliability. From this point, although it depends on the resin to be used, ethylene glycol (SP value 16.1), 1,2-hexanediol (SP value 12.1), 1,3-butanediol (SP value 13.6), triethylene glycol monomethyl ether (SP Value 10.7) and the like are preferably used.

The total content of the water-soluble organic solvent is preferably in a range of 5.0% by mass to 40% by mass, is further preferably in a range of 10% by mass to 35% by mass, and is particularly preferably in a range of 15% by mass to 30% by mass, with respect to the total mass of the ink composition. In addition, the total content of the organic solvent in which the difference in the SP value between the organic solvent and the resin is within 5 is preferably in a range of 10% by mass to 25% by mass, is further preferably in a range of 12% by mass to 23% by mass, and is particularly preferably in a range of 15% by mass to 20% by mass with respect to the total mass of the water-based ink composition. In addition, the total content of the organic solvent in which the difference in the SP value between the organic solvent and the resin is within 5 is preferably in a range of 0.1 parts by mass to 0.4 parts by mass with respect to 1 part by mass of water, is further preferably in a range of 0.2 parts by mass to 0.3 parts by mass with respect to 1 part by mass of water, and is particularly preferably in a range of 0.25 parts by mass to 0.35 parts by mass with respect to 1 part by mass of water. In this case, an appropriate amount of water is contained in the ink composition with respect to the organic solvent in which a difference in the SP value between the organic solvent and the resin is within 5, and thus in the recording with the ink jet head including the step nozzle, the dissolution and welding of the resin are less likely to occur in the pressure chamber.

Note that, the organic solvent having the boiling point which is equal to or higher than 280° C. absorbs moisture of the ink composition to thicken the ink composition in the vicinity of the ink jet head in some cases, and with this, the discharging reliability of the ink jet head may be deteriorated. In addition, when the organic solvent having a boiling point of 280° C. or higher is contained at a high concentration, the dryability of the ink composition on the recording medium may be lowered in some cases. For this reason, in the ink composition of the embodiment, the organic solvent having the standard boiling point of 280° C. or higher is not more than 5% by mass in the ink composition, is preferably not more than 3% by mass, is further preferably not more than 2% by mass, is still further preferably not more than 1% by mass, and particularly preferably not more than 0.5% by mass. In the case where the organic solvent having the boiling point of 280° C. or higher is not more than 5% by mass in the ink composition, the dryability of the ink composition on the recording medium is improved, and thus it is possible to form an excellent image in which the occurrence of bleeding is suppressed. In addition, stickiness of the obtained recorded material is reduced, and the abrasion resistance become excellent.

Examples of the organic solvent having a standard boiling point of equal to or higher than 280° C. include glycerin. Since the glycerin has high hygroscopicity and high boiling point, clogging of the head and malfunction may be caused in some cases. In addition, the glycerin is lack of the antiseptic properties, is likely to cause molds fungi and fungi to propagate, and thus is preferably not to be included in the ink composition.

1.2.4. Water

In the embodiment, the ink composition may contain water. Water is a main medium of the ink composition and is a component that evaporates and scatters by drying. The water contained in the ink composition prevents the resin in ink in the ink jet head from being dissolved and welded. Also, after the ink composition is attached to the recording medium, the water evaporates, the organic solvent concentration of the ink on the recording medium is increased, and thereby the resin in the ink is dissolved so that the film thickness is increased. Water is preferably obtained by removing ionic impurities such as pure water of ion-exchanged water, ultrafiltered water, reverse osmosis water, and distilled water, or ultrapure water as much as possible. When water sterilized by ultraviolet irradiation or addition of hydrogen peroxide is used, the generation of mold and bacteria can be suppressed in a case where the pigment dispersion and the ink composition using the pigment dispersion and stored for a long time, which is preferable.

The content of the water is preferably equal to or greater than 40% by mass, is further preferably equal to or greater than 50% by mass, is still further preferably equal to or greater than 60% by mass, and is particularly preferably equal to or greater than 70% by mass, with respect to the total mass of the water-based ink composition.

1.2.5. Surfactant

In the embodiment, the ink composition preferably contains a surfactant. The surfactant is not particularly limited, and examples thereof include an acetylene glycol surfactant, a fluorine surfactant, and a silicone surfactant. Among them, at least one thereof is preferably contained in the ink composition.

As the acetylene glycol surfactant is not particularly limited, one or more kinds selected from an alkylene oxide adduct of 2,4,7,9-tetramethyl-5-decyne-4,7-diol and 2,4,7,9-tetramethyl-5-decyne-4,7-diol, and an alkylene oxide adduct of 2,4-dimethyl-5-decyn-4-ol and 2,4-dimethyl-5-decyn-4-ol are preferable. Commercially available products of the acetylene glycol surfactant are not particularly limited, and examples thereof include OLFINE 104 series and OLFINE E series such as OLFINE E1010 (product names, prepared by Air Products and Chemicals Inc.) and SURFYNOL 465 and SURFYNOL 61 and SURFYNOL DF 110D (product names, prepared by Nissin Chemical Industry Co., Ltd). The acetylene glycol surfactant may be used alone or two or more kinds thereof may be used in combination.

The fluorine surfactant is not particularly limited, and examples thereof include perfluoroalkyl sulfonate, perfluoroalkyl carboxylate, perfluoroalkyl phosphate ester, a perfluoroalkyl ethylene oxide adduct, perfluoroalkyl betaine, and a perfluoroalkylamine oxide compound. Commercially available products of the fluorine surfactant are not particularly limited, and examples thereof include SURFLON 5144 and 5145 (product name, prepared by AGC SEIMI CHEMICAL CO., LTD.); FC-170C, FC-430, and FLUORAD-FC 4430 (product name, prepared by Sumitomo 3M Ltd.); FSO, FSO-100, FSN, FSN-100, and FS-300 (product name, prepared by Dupont); and FT-250, and 251 (product name, prepared by Neos Corporation). The fluorine surfactant may be used alone or two or more kinds thereof may be used in combination.

The silicone surfactant is not particularly limited, and examples thereof include a polysiloxane compound and polyether-modified organosiloxane. Commercially available products of the silicone surfactant are not particularly limited, and specific examples include BYK-306, BYK-307, BYK-333, BYK-341, BYK-345, BYK-346, BYK-347, BYK-348, and BYK-349 (which are product names, prepared by BYK Additives & Instruments), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (which are product names, prepared by Shin-Etsu Chemical Co., Ltd).

Among them, with an acetylene glycol surfactant, it is possible to further improve recoverability of nozzle clogging. On the other hand, a fluorine surfactant and a silicone surfactant have a function of spreading uniformly so as not to cause density irregularities and bleeding of the ink on the recording medium, and thus are preferably used. Accordingly, in the embodiment, the ink composition further preferably contains at least one of the silicone surfactant and the fluorine surfactant, and the acetylene glycol surfactant.

The lower limit of the content of the acetylene glycol surfactant is preferably equal to or greater than 0.1% by mass, is further preferably equal to or greater than 0.3% by mass, and is particularly preferably equal to or greater than 0.5% by mass, with respect to the total mass of the ink composition. On the other hand, the upper limit of the content is preferably equal to or less than 5% by mass, is further preferably equal to or less than 3% by mass, and is particularly preferably equal to or less than 2% by mass. When the content of the acetylene glycol surfactant is within the above range, an effect of improving the nozzle clogging recoverability can be easily obtained.

The lower limit of the content of the fluorine surfactant and the silicone surfactant is preferably equal to or greater than 0.5% by mass, and is further preferably equal to or greater than 0.8% by mass. On the other hand, the upper limit of the content is preferably equal to or less than 5% by mass, and is further preferably equal to or less than 3% by mass. When the content of the fluorine surfactant and the silicone surfactant is within the above range, the fluorine surfactant and the silicone surfactant have a function of spreading uniformly so as not to cause density irregularities and bleeding of the ink on the recording medium, and thus are preferably used.

1.2.6. Other containing components

In the embodiment, the ink composition may further contain a pH adjusting agent, a polyolefin wax, an antiseptic or mildew proofing agent, a rust preventive agent, a chelating agent, and the like. When these materials are added, it is possible to further improve the properties of the ink composition.

Examples of the pH adjuster include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium bicarbonate.

Examples of the polyolefin waxes include waxes and copolymers thereof prepared from olefins such as ethylene, propylene, and butylene, and specific examples thereof include polyethylene wax, polypropylene wax, polybutylene wax, and the like. As the polyolefin wax, commercially available polyolefin wax can be used, and specifically, NOPCOAT PEM 17 (product name, prepared by San Nopco Limited Ltd.), CHEMIPEARL W4005 (product name, prepared by Mitsui Chemicals, Inc.), and AQUACER 515, AQUACER 593 (product name, prepared by BYK Japan KK).

Adding the polyolefin wax is preferable from the viewpoint of improving the slipping property with respect to the physical contact of the image formed on the recording medium having non-ink absorbability or low ink absorbability, and improving the abrasion resistance of the image. The content of the polyolefin wax is preferably in a range of 0.01% by mass to 10% by mass, and is further preferably in a range of 0.05% by mass to 1% by mass, with respect to the total mass of the ink composition. When the content of the polyolefin wax is within the above range, the above-described effects are sufficiently exhibited.

Examples of the antiseptic or mildew proofing agent include sodium benzoate, sodium pentachlorophenol, sodium 2-pyridinethiol-1-oxide, sodium sorbate, sodium dehydroacetate, and 1,2-dibenzisothiazolin-3-one. As a commercially available product, Proxel XL2 and Proxel GXL (product name, prepared by Avecia) and, Denicide CSA and NS-500W (product names, prepared Nagase Kem made Tex Co., Ltd).

Examples of the rust inhibitor include benzotriazole.

Examples of the chelating agent include an ethylenediaminetetraacetic acid and salts thereof (such as ethylenediaminetetraacetic acid dihydrogen disodium salt).

1.2.7. Method of Preparing Ink Composition

The ink composition used in the embodiment can be obtained by mixing the above-mentioned components in an optional order, and filtering or the like as necessary so as to remove impurities. As a method of mixing the respective components, a method in which materials are sequentially added into a container equipped with a stirring device such as a mechanical stirrer and a magnetic stirrer, and stirring and mixing the materials is suitably used. As a filtration method, centrifugal filtration, filter filtration, and the like can be performed as necessary.

1.2.8. Physical Properties of Ink Composition

In the ink composition used in the embodiment, a surface tension at 20° C. is preferably in a range of 20 mN/m to 40 mN/m, and is further preferably in a range of 20 mN/m to 35 mN/m from the viewpoint of balance between the image quality and reliability as ink for ink jet recording. Note that, the measurement of the surface tension can be performed, for example, by confirming the surface tension when a platinum plate is wet with ink in an environment of 20° C. using an automatic surface tensiometer CBVP-Z (product name, manufactured by Kyowa Interface Science Co., Ltd).

In addition, from the same viewpoint, the viscosity at 20° C. of the ink composition used in the embodiment is preferably in a range of 3 mPa·s to 10 mPa·s, and is further preferably in a range of 3 mPa·s to 8 mPa·s. Note that, the measurement of the viscosity can be performed by measuring the viscosity in an environment of 20° C. using a viscoelasticity testing machine MCR-300 (manufactured by Pysica, Inc).

1.3. Treating Liquid

Next, the treating liquid used in the ink jet recording method described later will be described. In embodiment, as necessary, the treating liquid attaching step which is a pre-treatment using the treating liquid may be performed before the ink jet recording (the ink composition attaching step described below). When the treating liquid attaching step is performed, it is possible to improve the image quality and to record an image more excellent in the abrasion resistance. Here, the treating liquid contains an aggregating agent for aggregating components of the ink composition and an organic solvent such as a nitrogen-containing solvent.

Note that, in the embodiment, the treating liquid, in which the content of the coloring material is equal to or less than 0.2% by mass, is not the ink composition used for coloring the recording medium, but is an auxiliary liquid used to be attached to the recording medium before the ink composition is attached to the recording medium.

1.3.1. Aggregating Agent

In the embodiment, the treating liquid can contain an aggregating agent for aggregating the component of the water-based ink composition. When the treating liquid contains an aggregating agent, in an ink composition attaching step described below, the aggregating agent and the resin contained in the ink composition rapidly react with each other. Then, the dispersed state of the surface treated pigment and the resin in the ink composition is destroyed, and the surface treated pigment and the resin aggregate. In addition, since this agglomerate inhibits the penetration of the surface treated pigment into the recording medium, it is considered that the image quality of the recorded image is improved.

Examples of the aggregating agent include a polyvalent metal salt, a cationic polymer, and an organic acid. These aggregating agents may be used alone or two or more kinds thereof may be used in combination. Among these aggregating agents, it is preferable to use at least one aggregating agent selected from the group consisting of a polyvalent metal salt and an organic acid from the viewpoint of excellent reactivity with the resin contained in the ink composition.

The polyvalent metal salt is a compound that is composed of a polyvalent metal ion having two or more valences and an anion binding to these polyvalent metal ions and is soluble in water. Specific examples of the polyvalent metal ion include a divalent metal ion such as $Ca^{2+}$, $Cu^{2+}$, $Ni^{2+}$, $Mg^{2+}$, $Zn^{2+}$, and $Ba^{2+}$; $Al^{3+}$, and $Fe^{3+}$; and a trivalent metal ion such as $Cr^{3+}$. Examples of the anion include $Cl^-$, $I^-$, $Br^-$, $SO_4^{2-}$, $ClO^{3-}$, $NO^{3-}$, $HCOO-$, and $CH_3COO-$. Among these polyvalent metal salts, a calcium salt and a magnesium salt are preferable from the viewpoint of the stability of the treating liquid and the reactivity as an aggregating agent.

Preferable examples of the organic acid include a sulfuric acid, a hydrochloric acid, a nitric acid, a phosphoric acid, a polyacrylic acid, an acetic acid, a glycolic acid, a malonic acid, a malic acid, a maleic acid, an ascorbic acid, a succinic acid, a glutaric acid, a fumaric acid, a citric acid, a tartaric acid, a lactic acid, a sulfonic acid, an orthophosphoric acid, a pyrrolidone carboxylic acid, a pyrone carboxylic acid, a pyrrole carboxylic acid, a furancarboxylic acid, a pyridine carboxylic acid, a coumaric acid, an thiophenoffenecarboxylic acid, a nicotinic acid, and derivatives of these compounds, or salts thereof. The organic acid may be used alone or two or more kinds thereof may be used in combination.

Examples of the cationic polymer include a cationic urethane resin, a cationic olefin resin, and a cationic allylamine resin.

As the cationic urethane resin, known ones can be appropriately selected and used. As the cationic urethane resin, a commercially available product can be used, and examples thereof include HYDRAN CP-7010, CP-7020, CP-7030, CP-7040, CP-7050, CP-7060, and CP-7610 (which are product names, prepared by DIC Corporation), SUPER FLEXs 600, 610, 620, 630, 640, and 650 (which are product names, prepared by DAI-ICHI KOGYO SEIYAKU Co., Ltd.), and urethane emulsion WBR-2120C and WBR-2122C (which are product names, prepared by TAISEI FINE CHEMICAL Co., Ltd).

The cationic olefin resin has olefin such as ethylene and propylene as a structural skeleton, and the well-known resins can be appropriately selected to be used. Also, the cationic olefin resin may be an emulsion which is dispersed in a solvent including water or an organic solvent. As the cationic olefin resin, commercially available products can be used, and the examples thereof include Arrowbase CB-1200 and CD-1200 (which are product names, prepared by UNITIKA Ltd).

As the cationic allylamine-based resin, the well-known resins can be appropriately selected to be used, and the examples thereof include poly allylamine hydrochloride, poly allylamine amide sulfate, an allylamine hydrochloride•diallylamine hydrochloride copolymer, an allylamine acetate•diallylamine acetate copolymer, an allylamine acetate•diallylamine acetate copolymer, an allylamine hydrochloride•dimethyl allylamine hydrochloride copolymer, an allylamine•dimethyl allylamine copolymer, polydiallylamine hydrochloride, polymethyl diallylamine hydrochloride, polymethyl diallylamine amide sulfate, polymethyl diallylamine acetate, polydiallyl dimethyl ammonium chloride, a diallylamine acetate•sulfur dioxide copolymer, a diallyl methylethyl ammonium ethyl sulfate•sulfur dioxide copolymer, a methyldiallylamine hydrochloride•sulfur dioxide copolymer, a diallyldimethyl ammonium chloride•sulfur dioxide copolymer, and a diallyldimethyl ammonium chloride•acrylamide copolymer. As the cationic allylamine-based resin, commercially available products can be used, and the examples thereof include PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (which are product names, prepared by NITTOBO MEDICAL CO., LTD.), HYMO Neo-600, HYMOLOC Q-101, Q-311, and Q-501, HIMAX SC-505, and SC-505 (which are product names, prepared by HYMO Co., Ltd).

In addition, a cationic surfactant can also be used. Examples of the cationic surfactant include primary, secondary, and tertiary amine salt-type compounds, an alkylamine salt, a dialkylamine salt, an aliphatic amine salt, a benzalkonium salt, a quaternary ammonium salt, a quaternary alkylammonium salt, an alkyl pyridinium salt, a sulfonium salt, a phosphonium salt, an onium salt, and an imidazolinium salt. The specific examples thereof include hydrochlorides or acetates of laurylamine, coconut-type amine, rosin amine, lauryl trimethyl ammonium chloride, cetyl trimethyl ammonium chloride, benzyl tributyl ammonium chloride, benzalkonium chloride, dimethyl ethyl lauryl ammonium ethyl sulfate, dimethyl ethyl octyl ammonium ethyl sulfate, trimethyl lauryl ammonium hydrochloride, cetyl pyridinium chloride, cetyl pyridiniumbromide, dihydroxyethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, and octadecyl dimethyl ammonium chloride.

The concentration of the aggregating agent of the treating liquid may be equal to or greater than 0.03 mol/kg in 1 kg of the treating liquid. In addition, in 1kg of the treating liquid, the concentration of the aggregating agent of the treating liquid may be in a range of 0.1 mol/kg to 1.5 mol/kg, and may be in a range of 0.2 mol/kg to 0.9 mol/kg. Further, the content of the aggregating agent may be in a range of 0.1% by mass to 25% by mass, in a range of 1% by mass to 20% by mass, and 3% by mass to 10% by mass, with respect to the entire mass of the treating liquid.

1.3.2. Water

Water preferably functions as a main medium of the treating liquid used in the embodiment. The water is a component that is evaporated and dispersed by drying after attaching the treating liquid to the recording medium. Water is preferably obtained by removing ionic impurities such as pure water of ion-exchanged water, ultrafiltered water, reverse osmosis water, and distilled water, or ultrapure water as much as possible. In addition, when water sterilized by ultraviolet irradiation or addition of hydrogen peroxide is used, it is possible to prevent generation of molds or bacteria in a case where the treating liquid is stored for a long period of time, which is preferable. The content of the water contained in the treating liquid can be equal to or greater than 40% by mass, is preferably equal to or greater than 20% by mass, is further preferably equal to or greater than 30% by mass, and is still further preferably equal to or greater than 40% by mass, with respect to the total mass of the treating liquid.

1.3.3. Organic Solvent

The treating liquid used in the embodiment may contain an organic solvent. When the organic solvent is contained, it is possible to improve the wettability of the treating liquid with respect to the recording medium. As the organic solvent, it is possible to use the same one as the organic solvent exemplified as the above-described ink composition. The content of the organic solvent is not particularly limited, and for example, it can be in a range of 10% by mass to 80% by mass, and is preferably in a range of 15% by mass to 70% by mass with respect to the total mass of the treating liquid.

Note that, similar to the above-described ink composition, in the treating liquid, as the organic solvent, the content of the water-soluble organic solvent having the standard boiling point of higher than 280° C. is preferably not to greater than 5% by mass, is further preferably not to greater than 3% by mass, is still further preferably not to greater than 2% by mass, is still further preferably not to greater than 1% by mass, and is particularly preferably not to greater than 0.5% by mass. In this case, the driability of the treating liquid is excellent, and thus the drying of the treating liquid is rapidly performed, and reduction of stickiness and the abrasion resistance of the obtained recorded material are also excellent.

1.3.4. Surfactant

The treating liquid used in the embodiment may add a surfactant. When the surfactant is added, the surface tension of the treating liquid is reduced, and thereby it is possible to improve the wettability of the recording medium. Among the surfactants, for example, an acetylene glycol-based surfactant, as silicon-based surfactant, a fluorine-based surfactant can be preferably used. As specific examples of these surfactants, the same surfactants as those exemplified for the ink composition described later can be used. The content of the surfactant is not particularly limited, and it can be in a range of 0.1% by mass to 1.5% by mass with respect to the total mass of the treating liquid.

1.3.5. Other Components

In the embodiment, the treating liquid may add, as necessary, a pH adjusting agent, a polyolefin wax, an antiseptic or mildew proofing agent, a rust preventive agent, a chelating agent, and the like.

1.3.6 Method of Preparing Treating Liquid

The treating liquid used in the embodiment can be prepared by dispersing and mixing the above-described components using an appropriate method. After thoroughly stirring each of the above components, filtration is performed in order to remove coarse particles and foreign matters which cause clogging, and thereby a desired treating liquid can be obtained.

1.3.7. Physical Properties of Treating Liquid

In a case where the treating liquid used in the embodiment is discharged by using an ink jet head, the surface tension at a temperature of 20° C. is preferably in a range of 20 mN/m to 40 mN/m, is further preferably in a range of 23 mN/m to 35 mN/m, and is still further preferably in a range of 25 mN/m to 33 mN/m. The surface tension can be measured by for example, confirming the surface tension when a platinum plate is wet by the treating liquid in an environment of 20° C., using an automatic surface tensiometer CBVP-Z (product name, manufactured by Kyowa Interface Science Co., Ltd).

In addition, from the same viewpoint, the viscosity of the treating liquid in the embodiment at a temperature of 20° C. is preferably in a range of 3 mPa·s to 10 mPa·s, and is further preferably in a range of 3 mPa·s to 8 mPa·s. Note that, the measurement of the viscosity can be performed by measuring the viscosity in an environment of 20° C. using a viscoelasticity testing machine MCR-300 (manufactured by Pysica, Inc).

1.4. Recording Medium

The above-described ink composition can be used for ink jet recording on various recording media, but in particular, the recording on the recording medium having non-ink absorbability or low ink absorbability, an image excellent in the abrasion resistance can be obtained, and thus the recording medium having non-ink absorbability or low ink absorbability can be preferably used.

Examples of the recording medium having non-ink absorbability include a medium to which a plastic film which is not subjected to a surface treatment for ink jet recording (that is, no ink absorbing layer is formed), a medium to which plastic is coated on a base material such as paper, and a medium to which a plastic film is bonded. Examples of the plastic herein include polyvinyl chloride, polyethylene terephthalate, polycarbonate, polystyrene, polyurethane, polyethylene, and polypropylene. Examples of the recording medium having low ink absorbability include printing paper such as art paper, coated paper, and mat paper. Note that, in the present specification, the recording medium having non-ink absorbability or low ink absorbability is also simply referred to as "plastic media".

Here, in the present specification, the "recording medium having non-ink absorbability or low ink absorbability" means "recording medium of which the water absorption amount is equal to or less than 10 mL/m2 within 30 msec1/2 from the start of contacting a liquid according to Bristow method". The Bristow method is most widely used as a method for measuring the liquid absorption amount in a short period of time, and has been adopted by Japan Technical Association of the Pulp and Paper Industry (Japan TAPPI). The details of the testing method is described in the standard No. 51 "Paper and Paperboard-liquid absorbability testing method-Bristow method" of the "JAPAN TAPPI paper and pulp testing method 2000 version".

Examples of the recording medium having non-ink absorbability include a medium in which a base material such as a plastic film having no ink absorbing layer and paper is coated with plastic, and a medium to which plastic is coated on paper, and a medium to which a plastic film is bonded. Examples of the plastic herein include polyvinyl chloride, polyethylene terephthalate, polycarbonate, polystyrene, polyurethane, polyethylene, and polypropylene.

Examples of the recording medium having low ink absorbability include a recording medium provided with a coating layer for receiving an ink on the surface thereof. As the paper base material, for example, printing paper such as art paper, coated paper, and mat paper can be exemplified. In a case where the base material is a plastic film, the examples thereof include a film of which the surface such as polyvinyl chloride, polyethylene terephthalate, polycarbonate, polystyrene, polyurethane, polyethylene, and polypropylene is coated with a hydrophilic polymer, and a film coated with particles such as silica and titanium, and a binder. These recording media may be transparent recording media.

In addition, the recording medium having non-ink absorbability or low ink absorbability which has surface unevenness, such as embossed media, can be used as well.

In a case where the ink jet recording apparatus 1 is a serial type recording apparatus, the recording medium is preferably equal to or less than 3.2 m. In this case, the time during which the recording medium M faces the ink jet head 2 during one main scanning, that is, the time during which the nozzle 22 which is not used during one main scanning receives heat from the recording medium M is preferably equal to or shorter than 12 seconds, and thus drying and composition variation of the ink composition in the nozzle 22 can be suppressed, and welding of the resin to the inner wall of the nozzle 22 can be reduced. As a result, the ink jet recording method which is capable of forming an image excellent in the abrasion resistance and is excellent in the discharging reliability is realized. Note that, the lower limit of the width of the recording medium is preferably equal to or greater than 30 cm.

2. Ink Jet Recording Method

An ink jet recording method according to the embodiment includes attaching an ink composition, with which a pressure chamber of an ink jet head is filled, to a recording medium by discharging the ink composition via a nozzle port, in which the ink jet head includes a step between the pressure chamber and the nozzle port, the ink composition contains water, a resin, and an organic solvent including at least a nitrogen-containing solvent, and the organic solvent includes an organic solvent, in which a difference in a SP value between the organic solvent and the resin is within 5, in a range of 0.1 part by mass to 0.4 parts by mass with respect to 1 part by mass of water, and does not include an organic solvent which has a standard boiling point of equal to higher than 280° C. and the content of than 5% by mass in the ink composition. Hereinafter, description will be made with reference to the drawings.

2.1. Ink Composition Attaching Step

The ink composition attaching step is a step of attaching the ink composition with which the pressure chamber 21 of the ink jet head 2 as illustrated in FIG. 2 is filled to the recording medium M by discharging the ink composition through the nozzle port 24a. With this step, an image formed of the ink composition is formed on the surface of the recording medium M.

Here, in the embodiment, the "image" means a recording pattern formed from the group of dots, and examples thereof include text printing and a solid image. In addition, the "solid image" means an image pattern which is an image in which dots of a pixel, which is a minimum recording unit region defined by a recording resolution, are recorded with respect to all pixels, and usually a recording region of the recording medium area is covered with ink so that other parts except for the recording medium area are not seen.

In the embodiment, the ink jet head 2 is provided with the step 22a between the pressure chamber 21 as illustrated in FIG. 2 and the nozzle port 24a.

The maximum attachment amount of the ink composition per unit area of the recording medium is preferably in a range of 5 to 20 mg/inch$^2$, is further preferably in a range of 7 to 15 mg/inch$^2$, and is still further preferably in a range of 8 to 13 mg/inch$^2$. The maximum attachment amount of the ink composition per unit area of the recording medium is preferably within the above range, from the viewpoint of enabling recording of useful images and obtaining excellent image quality.

At the time of attaching the ink composition to the recording medium M, the ink composition is preferably attached to the heated recording medium. When the ink composition is attached to the heated recording medium, the dryability of the ink composition on the recording medium M is improved, and thus the occurrence of bleeding is suppressed. With this, it is possible to form an image which is more excellent in the film forming properties of the ink coated film, and is excellent in the abrasion resistance.

The surface temperature of the recording medium M at the time of attaching the ink is preferably in a range 25° C. to 60° C., is further preferably in a range 30° C. to 50° C., and is still further preferably in a range 35° C. to 45° C. With this, the radiation heat received from the IR heater 3 and the platen heater 4 is reduced or eliminated, and thus drying of the ink composition and composition variation thereof in the ink jet head 2 can be suppressed, and welding of the resin to the inner wall of the ink jet head 2 can be reduced, and thereby an ink jet recording method excellent in the discharging reliability is realized.

In a case where the ink jet recording apparatus 1 is a serial printer, the time during which the recording medium M faces the ink jet head 2 during one main scanning is preferably equal to or shorter than 12 seconds. The upper limit of this time is further preferably equal to or shorter than 10 seconds, and is particularly preferably equal to or shorter than 6 seconds. The lower limit of this time is preferably equal to or longer than 1 second, is further preferably equal to or longer than 2 seconds, and is particularly preferably equal to or longer than 3 seconds. The time during which the recording medium M faces the ink jet head 2 during one main scanning is equal to the time that nozzles 22 which are not used during one main scanning receive heat from recording medium M. In other words, if this time is within the above range, the time that the nozzles 22 which are not used during one main scanning receive heat from the recording medium M is sufficiently short, and thus it is possible to suppress the drying of the water-based ink composition in the nozzle 22 and composition variation thereof in the ink, and it is possible to reduce welding of the resin to an inner wall of the nozzle 22. As a result, the landing deviation of ink at the time of continuous printing can be suppressed, and the clogging recoverability of the nozzle 22 is further improved.

2.2. Drying Step

The ink jet recording method according to the embodiment may also include a drying step of drying the surface of the recording medium M on which the water-based ink composition is attached by a hardening heater 5 as illustrated in FIG. 1 after the ink composition attaching step. With this, the resin contained in the ink composition on the recording medium M is melted, and the film forming properties of the coated film become excellent, thereby forming an image excellent in the abrasion resistance. The drying temperature by the hardening heater 5 is preferably in a range of 40° C. to 120° C., is further preferably in a range of 60° C. to 100° C., and is still further preferably in a range of 80° C. to 90° C. When the drying temperature is within the above range, the film forming properties and the abrasion resistance are further improved. Further, the ink composition on the recording medium M may be cooled by the cooling fan 6 as illustrated in FIG. 1. In this case, it is possible to further form an ink film on the recording medium M with high adhesion.

2.3. Cleaning Step

The ink jet recording method according to the embodiment may include a cleaning step of discharging the ink composition from the ink jet head by an action from the outside of the ink jet head by units other than a pressure generation unit for discharging and recording ink, that is, mechanisms other than a mechanism for discharging ink for recording provided in the ink jet head.

As described above, examples of the mechanism that is provided in the ink jet head 2 so as to discharge ink for recording include a piezoelectric element 23 for applying pressure to ink provided in the pressure chamber 21 and a heater element. In contrast, in the cleaning step, for example, a step of discharging the ink composition from the nozzle 22 by applying the pressure to the ink jet head 2 from the outside is provided. With these steps provided, even in a case where there is a fear that the resin may be welded to the inner wall of the ink jet head 2, such a fear can be suppressed and the clogging property can be further improved.

In addition, in the ink jet recording method according to the embodiment, it is preferable to control the recording for one hour or more without performing the above-described cleaning step. When the controlling is performed in this manner, the recording speed is not reduced by interrupting the recording along with the cleaning step, which is preferable. Even in such a case, by using the above-described ink composition, it is possible to suppress landing deviation of ink at the time of continuous printing, and thus an ink jet recording method which is capable of forming an image excellent in the abrasion resistance and is excellent in the discharging reliability can be obtained.

Here, as another mechanism described above, a mechanism for applying pressure such as application of suction (negative pressure), application of positive pressure from the upstream of the head, and the like can be exemplified. This mechanism is not for ink discharge (such as flushing) using a function of the ink jet head. That is, in the recording, the aforementioned mechanism is not for the ink discharge using a function of discharging the ink from the ink jet head.

Also, the recording time may not be continuous, and it may be paused unless externally applying pressure to the ink jet head and discharging the ink composition from the nozzle. Here, the recording time is a recording time including the pause time between recordings. The recording time may be preferably equal to or longer than one hour, is preferably equal to or longer than 1.5 hours, is still further preferably equal to or longer than two hours, and is particularly preferably equal to or longer than three hours. The upper limit of the recording time is not limited, and is preferably equal to or shorter than ten hours, is further preferably equal to or shorter than five hours, and is still further preferably equal to or shorter than four hours.

In addition, in the ink jet recording method according to the embodiment, it is preferable in the above-mentioned point of view not to perform the above cleaning step during the recording in one recording. Even if the above-described cleaning step is performed at least either before recording or after recording, it is preferable in view of the above points.

2.4. Treating Liquid Attaching Step

In the ink jet recording method according to the embodiment, before the ink composition attaching step, a treating liquid attaching step of attaching the above-described treating liquid to the recording medium before attaching the ink composition to the recording medium may be provided. When the treating liquid attaching step is performed, it is possible to improve the image quality and to record an image more excellent in the abrasion resistance.

Before the treating liquid attaching step, it is preferable that the recording medium M be heated by the IR heater 3 or the platen heater 4 as illustrated in FIG. 1 by the preheater 7 as illustrated in FIG. 1 or during the treating liquid attaching step. When the treating liquid is attached onto the heated recording medium M, the treating liquid discharged to the recording medium M more easily spreads on the recording medium M, and the recording medium M can be uniformly coated with the treating liquid. For this reason, the ink attached in the ink composition attaching step and the treating liquid sufficiently react with each other so that excellent image quality can be obtained. In addition, the treating liquid uniformly applied on the recording medium M, and thus it is possible to reduce a coating amount. For this reason, it is possible to prevent the abrasion resistance of the obtained image from being deteriorated.

The surface temperature of the recording medium M at the time of attaching the treating liquid to the recording medium M is preferably in a range 25° C. to 60° C., is further preferably in a range 30° C. to 50° C., and is still further preferably in a range 35° C. to 45° C. In a case where the temperature of the treating liquid, it is possible to uniformly coat the treating liquid on the recording medium M, and to improve the image quality. In addition, it is possible to prevent the ink jet head 2 from being affected by heat.

The attachment amount of the treating liquid in the treating liquid attaching step is preferably equal to lower than 10 mg/inch$^2$, is further preferably in a range of 0.1 to 10 mg/inch$^2$, is still further preferably in a range of 0.3 to 5 mg/inch$^2$, is particularly preferably in a range of 0.5 to 3 mg/inch$^2$, and is further particularly preferably in a range of 0.7 to 2 mg/inch$^2$. In addition, the maximum attachment amount of the treating liquid of the treating liquid attaching step is preferably in a range of 0.5 to 10 mg/inch$^2$, is further preferably in a range of 0.5 to 5 mg/inch$^2$, is still further preferably in a range of 0.7 to 3 mg/inch$^2$, and is particularly preferably in a range of 0.7 to 2 mg/inch$^2$. When the attachment amount and the maximum attachment amount are within the above ranges, more excellent image quality can be easily obtained, and the time required for the attaching step can be shortened. With this, an adverse effect on the recorded matter caused by excessive attachment amount to the recording medium such as the organic solvent which has a standard boiling point of 280° C. or more and contained in the treating liquid is prevented, which is preferable.

The attachment amount of the treating liquid in the treating liquid attaching step is an attachment amount of the treating liquid in the treating liquid attaching step in an area where the treating liquid attaching step and the ink composition attaching step of the ink jet recording method are performed, and has an area where at least the attachment amount is the attachment amount in the above area.

In addition, the maximum attachment amount of the treating liquid in the treating liquid attaching step is an attachment amount of the treating liquid in an area where the attachment amount of the treating liquid in the treating liquid attaching step is the maximum, in the area where the treating liquid attaching step and the ink composition attaching step of the ink jet recording method are performed. Accordingly, in the area where the treating liquid attaching step and the ink composition attaching step are performed, other areas where the attachment amount is less than the maximum attachment amount may be provided.

Further, in the area where the attachment amount of the ink composition is the maximum attachment amount of the ink composition in the area where the treating liquid attaching step and the ink composition attaching step are performed, the attachment amount of the treating liquid is preferably to be within the above range. In addition, in the area where the treating liquid attaching step and the ink composition attaching step are performed, from the area where the attachment amount of the ink composition is the maximum attachment amount of the ink composition to an area where the attachment amount is 60% by mass of the maximum attachment amount, the attachment amount of the treating liquid is further preferably to be within the above range. Note that, the attachment of the treating liquid may be performed by discharging by using the ink jet head 2, and examples of the attaching method include a method of coating the recording medium with treating liquid by using a rolling coater, and a method of ejecting the treating liquid such as a spay method. Further, in the embodiment, the ink composition attaching step and the treating liquid attaching step may be performed at the same time.

As described above, in the ink jet recording method according to the embodiment, when the difference in the SP value between the organic solvent including a nitrogen-containing solvent and the resin is set to be within 5, and the content thereof is set to be a predetermined value, in the recording with the ink jet head including a step nozzle, the film forming properties of the ink become excellent, and thus it is possible to provide an ink jet recording method which is capable of forming an image excellent in the abrasion resistance, and is excellent in the discharging reliability.

Note that, this embodiment may be a method of controlling the ink jet recording apparatus. The control method is a method of controlling in which the control unit included in the ink jet recording apparatus performs control so that the ink jet recording apparatus performs the above-described ink jet recording method and cleaning step.

3. Examples

Hereinafter, the embodiment of the invention will be further specifically described with Examples and Comparative Examples, but the embodiment is not limited to the following examples.

3.1 Method of Preparing Ink Composition

The ink compositions were obtained by mixing and stirring each component so as to obtain a blending ratio in Tables 1 and 2. The resin content in tables indicates the content of the resin solid content.

TABLE 1

| | | SP value | Boiling point (° C.) | Example 1 | Example 2 | Example 3 | Example 4 |
|---|---|---|---|---|---|---|---|
| Coloring material | PB 15:3 pigment | — | — | 4% | 4% | 4% | 4% |
| Solvent | 1,2-hexanediol | 12.1 | 216 | 5% | 5% | 7% | 5% |
| | 1,3-BG | 13.6 | 207 | 5% | 0% | 0% | 0% |
| | Glycerin | 16.7 | 290 | 0% | 0% | 0% | 0% |
| | Ethylene glycol | 16.1 | 197 | 0% | 0% | 0% | 0% |
| | Triethylene glycol monomethyl ether | 10.7 | 249 | 0% | 0% | 0% | 0% |
| Nitrogen-containing solvent | 2-pyrrolidone | 11.5 | 245 | 10% | 15% | 5% | 20% |
| | NMP | 11.2 | 79 | 0% | 0% | 0% | 0% |
| Surfactant | BYK348 | — | — | 1% | 1% | 1% | 1% |
| | DF110D | — | — | 0.50% | 0.50% | 0.50% | 0.50% |
| Resin | Resin A (styrene•acrylic resin) | 9 | — | 3% | 0% | 3% | 0% |
| | Resin B vinyl chloride•acrylic resin | 10 | — | 0% | 3% | 0% | 3% |
| Water | Pure water | 24 | 100 | 71.5% | 71.5% | 79.5% | 66.5% |
| | Total amount of organic solvent in which difference between resin and organic solvent is within 5 | | | 20 | 20 | 12 | 25 |
| | Ratio of organic solvent in which difference between resin and organic solvent is within 5 to water | | | 0.28 | 0.28 | 0.15 | 0.38 |
| | Surface temperature of recording medium at the time of printing | | | 40° C. | 40° C. | 40° C. | 40° C. |
| | Head type | | | Step shape | Step shape | Step shape | Step shape |
| Evaluation | Abrasion resistance | | | A | A | B | A |
| | Clogging property | | | A | B | A | B |
| | Continuous printing | | | A | A | A | B |

TABLE 1-continued

|  |  | Example 5 | Example 6 | Example 7 | Example 8 | Example 9 |
|---|---|---|---|---|---|---|
| Coloring material | PB 15:3 pigment | 4% | 4% | 4% | 4% | 4% |
| Solvent | 1,2-hexanediol | 0% | 5% | 5% | 5% | 5% |
|  | 1,3-BG | 0% | 5% | 5% | 5% | 0% |
|  | Glycerin | 0% | 0% | 0% | 0% | 0% |
|  | Ethylene glycol | 0% | 0% | 0% | 0% | 0% |
|  | Triethylene glycol monomethyl ether | 0% | 0% | 0% | 0% | 0% |
| Nitrogen-containing solvent | 2-pyrrolidone | 15% | 0% | 10% | 10% | 20% |
|  | NMP | 0% | 10% | 0% | 0% | 0% |
| Surfactant | BYK348 | 1% | 1% | 1% | 1% | 1% |
|  | DF110D | 0.50% | 0.50% | 0.50% | 0.50% | 0.50% |
| Resin | Resin A (styrene•acrylic resin) | 0% | 0% | 3% | 3% | 0% |
|  | Resin B vinyl chloride•acrylic resin | 3% | 3% | 0% | 0% | 3% |
| Water | Pure water | 76.5% | 71.5% | 71.5% | 71.5% | 66.5% |
|  | Total amount of organic solvent in which difference between resin and organic solvent is within 5 | 15 | 20 | 20 | 20 | 25 |
|  | Ratio of organic solvent in which difference between resin and organic solvent is within 5 to water | 0.20 | 0.28 | 0.28 | 0.28 | 0.38 |
|  | Surface temperature of recording medium at the time of printing | 40° C. | 40° C. | 60° C. | 25° C. | 35° C. |
|  | Head type | Step shape | Step shape | Step shape | Step shape | Step shape |
| Evaluation | Abrasion resistance | A | B | A | B | B |
|  | Clogging property | B | A | A | A | B |
|  | Continuous printing | B | A | B | A | A |

TABLE 2

|  |  | SP value | Boiling point (° C.) | Comparative Example 1 | Comparative Example 2 | Comparative Example 3 |
|---|---|---|---|---|---|---|
| Coloring material | PB 15:3 pigment | — | — | 4% | 4% | 4% |
| Solvent | 1,2-hexanediol | 12.1 | 216 | 0% | 0% | 10% |
|  | 1,3-BG | 13.6 | 207 | 5% | 0% | 5% |
|  | Glycerin | 16.7 | 290 | 10% | 0% | 5% |
|  | Ethylene glycol | 16.1 | 197 | 0% | 10% | 0% |
|  | Triethylene glycol monomethyl ether | 10.7 | 249 | 0% | 0% | 0% |
| Nitrogen-containing solvent | 2-pyrrolidone | 11.5 | 245 | 10% | 5% | 0% |
|  | NMP | 11.2 | 79 | 0% | 0% | 0% |
| Surfactant | BYK348 | — | — | 1% | 1% | 1% |
|  | DF110D | — | — | 0.50% | 0.50% | 0.50% |
| Resin | Resin A (styrene•acrylic resin) | 9 | — | 3% | 3% | 3% |
|  | Resin B vinyl chloride•acrylic resin | 10 | — | 0% | 0% | 0% |
| Water | Pure water | 24 | 100 | 66.5% | 76.5% | 71.5% |
|  | Total amount of organic solvent in which difference between resin and organic solvent is within 5 |  |  | 15 | 5 | 15 |
|  | Ratio of organic solvent in which difference between resin and organic solvent is within 5 to water |  |  | 0.23 | 0.07 | 0.21 |
|  | Surface temperature of recording medium at the time of printing |  |  | 40° C. | 40° C. | 40° C. |
|  | Head type |  |  | Step shape | Step shape | Step shape |
| Evaluation | Abrasion resistance |  |  | C | B | C |
|  | Clogging property |  |  | A | C | A |
|  | Continuous printing |  |  | A | B | A |

|  |  | Comparative Example 4 | Comparative Example 5 | Reference Example 1 | Reference Example 2 |
|---|---|---|---|---|---|
| Coloring material | PB 15:3 pigment | 4% | 4% | 4% | 4% |
| Solvent | 1,2-hexanediol | 5% | 16% | 5% | 5% |
|  | 1,3-BG | 0% | 11% | 5% | 0% |
|  | Glycerin | 0% | 0% | 0% | 0% |
|  | Ethylene glycol | 0% | 0% | 0% | 0% |
|  | Triethylene glycol monomethyl ether | 0% | 0% | 0% | 0% |

TABLE 2-continued

| | | | | | |
|---|---|---|---|---|---|
| Nitrogen-containing solvent | 2-pyrrolidone | 30% | 0% | 10% | 30% |
| | NMP | 0% | 0% | 0% | 0% |
| Surfactant | BYK348 | 1% | 1% | 1% | 1% |
| | DF110D | 0.50% | 0.50% | 0.50% | 0.50% |
| Resin | Resin A (styrene•acrylic resin) | 3% | 3% | 3% | 3% |
| | Resin B vinyl chloride•acrylic resin | 0% | 0% | 0% | 0% |
| Water | Pure water | 56.5% | 64.5% | 71.5% | 56.5% |
| | Total amount of organic solvent in which difference between resin and organic solvent is within 5 | 35 | 27 | 20 | 35 |
| | Ratio of organic solvent in which difference between resin and organic solvent is within 5 to water | 0.62 | 0.42 | 0.28 | 0.62 |
| | Surface temperature of recording medium at the time of printing | 40° C. | 40° C. | 40° C. | 40° C. |
| | Head type | Step shape | Step shape | Conical shape | Conical shape |
| Evaluation | Abrasion resistance | A | C | A | A |
| | Clogging property | C | A | A | A |
| | Continuous printing | C | A | A | A |

Note that, details of each material used are as follows.

Pigment

PB 15:3 (product name, "CHROMOFINE", C.I. Pigment Blue 15:3, prepared by Dainichiseika Color & Chemicals Mfg. Co., Ltd.) Nitrogen-containing solvent NMP (N-methyl-2-pyrrolidone)

Surfactant

BYK348 (product name, prepared by BYK Japan, silicone surfactant)

DF110D (product name, "SAFYNOL DF110D", acetylene glycol surfactant, prepared by Nisshin Chemical Industry Co., Ltd.) Resin Resin A (product name "JURYMER AT-613", prepared by Toagosei Co., Ltd., styrene•acrylic resin, Tg of 76° C., solid content in a range of 23.5% to 26.5%)

Resin B (product name "VINYBRAN 700", prepared by Nissin Chemical Industry CO., Ltd, vinyl chloride•acrylic resin, Tg of 70° C., solid content of 30%)

3.2. Evaluation 3.2.1. Recording Test

An ink jet printer (product name "PX-G930", manufactured by SEIKO EPSON CORPORATION) was filled with the ink composition so as to perform the recording on the recording medium (CLEAR PROOF FILM, manufactured by SEIKO EPSON CORPORATION). Specifically, a filling pattern capable of recording with 100% duty at a resolution of 720 dpi×720 dpi was prepared and used. At this time, the surface temperature of the recording medium was 50° C. This evaluation was performed in a laboratory under the condition of room temperature (25° C.).

Thereafter, by confirming the ink peeling state of the recording surface and ink transfer state to cotton cloth when the recording surface of the recorded material obtained by being left to stand for one hour in the laboratory under the condition of room temperature (25° C.) was rubbed 20 times with 200 g of load by using Gakushin-type rubbing tester AB-301 (manufactured by Tester Sangyo), the abrasion resistance was evaluated based on the following criteria.

Evaluation Criteria

A: There is no scratch or peeling.
B: There are scratches or peelings equal to or less than 1% of a stroke area.
C: There are scratches or peelings equal to or greater than 1% and less than 10% of a stroke area.
D: There are scratches or peelings equal to or greater than 10% and less than 50% of a stroke area.
E: There are scratches or peelings equal to or greater than 50% of a stroke area.

In Tables 1 and 2, the head types each means the following.

Step shape: the ink jet head illustrated in FIG. 2 in which the nozzle 22 has the step 22a and also has the retention portion 26 in the head.
The nozzle formation plate 20 was obtained by etching the silicon layer to form the nozzle 22.
Conical shape: although the structure is the same as the step-shaped head as illustrated in FIG. 2, the nozzle formation plate is obtained by mechanically forming a hole in the metal layer to form a nozzle, so that the nozzle is has a conical shape.
Here, this head is not suitable for mass production, and is difficult to manufacture.

3.2.2 Head Clogging and Discharging Reliability

The ink jet printer (product name "PX-H8000", manufactured by SEIKO EPSON CORPORATION) was filled with the ink composition, and was left to stand for one month in a state where the cap was open. Thereafter, cleaning was performed three times, how many nozzles were missing was determined, and then evaluation based on the following criteria was performed.

Evaluation Criteria

A: The number of missing nozzles is 0
B: The number of missing nozzles is 1 to 5
C: The number of missing nozzles is 6 to 20
D: The number of missing nozzles is more than 21

3.2.3. Continuous Printing (Discharging Reliability)

An ink jet printer (product name "PX-G930", manufactured by SEIKO EPSON CORPORATION) was filled with the ink composition so as to perform the recording on the recording medium (CLEAR PROOF FILM, manufactured by SEIKO EPSON CORPORATION). Specifically, a filling pattern capable of recording with 100% duty at a resolution of 720 dpi×720 dpi was prepared and used. 100 A4-sized sheets were printed, the nozzle missing was confirmed, and then evaluation based on the following criteria was performed.

Evaluation Criteria

A: The number of missing nozzles is 0
B: The number of missing nozzles is 1 to 5
C: The number of missing nozzles is 6 to 20
D: The number of missing nozzles is more than 21

3.3. Evaluation Results

Evaluation test results are indicated on the lower side of Tables 1 and 2.

In each of the examples, the evaluation was B or higher, an image excellent in the abrasion resistance was formed, and excellent discharging reliability of the ink was obtained. According to the comparison of Examples 1 to 4, the abrasion resistance was high when the ratio of the organic solvent in which the difference in the SP value between the organic solvent and the resin is within 5 to water was high, and the discharging reliability was high when the above ratio was low. Also, according to the comparison of Examples 1, 2 and 5, the discharging reliability was high when the ratio of the nitrogen-containing solvent to the organic solvent was low. Further, according to the comparison of Examples 1, 7 and 8, the discharging reliability was deteriorated when the surface temperature of the recording medium at the time of printing was high, and the abrasion resistance was deteriorated when the surface temperature was low. Further, According to the comparison of Examples 4 and 9, when the surface temperature of the recording medium at the time of printing is lower than 40° C., although the abrasion resistance is somewhat deteriorated, continuous printing is improved, and in the case where the ratio of the organic solvent in which the difference in the SP value between the organic solvent and the resin is within 5 to water was high, it was found that the surface temperature of the recording medium at the time of printing is further preferably equal to or higher than 38° C.

In contrast, in Comparative Example 1, the ink composition contained the organic solvent having a standard boiling point of equal to or higher than 280° C. in an amount of more than 5% by mass, and thus the abrasion resistance was deteriorated as compared with Example 1, and in Comparative Example 2, the ratio of the organic solvent in which the difference in the SP value between the organic solvent and the resin is within 5 to water was excessively low, and thus the abrasion resistance and the discharging reliability were also low as compared with Example 1. Further, in Comparative Example 3, since the nitrogen-containing solvent was not contained, the abrasion resistance was deteriorated as compared with Example 1. In Comparative Example 4, the ratio of the organic solvent in which the difference in the SP value between the organic solvent and the resin is within 5 to water was excessively high, and thus the discharging reliability was low as compared with Example 1. In Comparative Example 5, the ink composition does not contain the nitrogen-containing solvent and the ratio of the organic solvent in which the difference in the SP value between the organic solvent and the resin is within 5 to water was excessively high, and thus the abrasion resistance was low as compared with Example 1. Thus, when the nitrogen-containing solvent is not contained as the organic solvent, even though the ratio of the organic solvent in which the difference in the SP value between the organic solvent and the resin is within 5 to water was more than 0.4, the abrasion resistance was deteriorated while the discharging reliability is secured. According to Reference Examples 1 and 2, in the case where the nozzle has a conical shape, even though the ratio of the organic solvent in which the difference in the SP value between the organic solvent and the resin is within 5 to water was more than 0.4, discharge failure of the ink due to the dissolution and welding of the resin did not occur, and the discharge reliability was not deteriorated as in Comparative Example 4.

As described above, in the examples, it was possible to provide an ink jet recording method having high abrasion resistance and excellent in the discharging reliability.

The invention is not limited to the above-described embodiments, and various modifications are possible. For example, the invention includes a configuration substantially the same as that described in the embodiment (for example, a configuration having the same function, method, and result, or a configuration having the same object and effect). Further, the invention includes a configuration in which non-essential parts of the configuration described in the embodiment are replaced. Further, the invention includes a configuration that can achieve the same effects as the configuration described in the embodiment, or a configuration that can achieve the same object. In addition, the invention includes a configuration in which a well-known technique is added to the configuration described in the embodiment.

The entire disclosure of Japanese Patent Application No. 2017-063117, filed March 28, 2017 is expressly incorporated by reference herein.

What is claimed is:
1. An ink jet recording method comprising:
attaching an ink composition, with which a pressure chamber of an ink jet head is filled, to a recording medium by discharging the ink composition via a nozzle port,
wherein the ink jet head includes a step between the pressure chamber and the nozzle port,
wherein the ink composition contains water, a resin, and an organic solvent including at least a nitrogen-containing solvent, and
wherein the organic solvent includes an organic solvent, in which a difference in a SP value between the organic solvent and the resin is within 5, in a range of 0.1 part by mass to 0.4 parts by mass with respect to 1 part by mass of water, and does not include an organic solvent which has a standard boiling point of equal to higher than 280° C. and the content of more than 5% by mass in the ink composition.
2. The ink jet recording method according to claim 1, wherein as the nitrogen-containing solvent, 5% by mass or more of nitrogen-containing solvent, in which a difference in a SP value between the resin and the nitrogen-containing solvent is within 3, is contained in the ink composition.
3. The ink jet recording method according to claim 1, wherein a content of an organic solvent other than the nitrogen-containing solvent is equal to or greater than 5% by mass.
4. The ink jet recording method according to claim 1, wherein a total amount of an organic solvent in the ink composition is equal to or greater than 15% by mass.

5. The ink jet recording method according to claim 1,
wherein in the attaching of the ink composition, the ink composition is attached to the heated recording medium at the time of attaching the ink composition to the recording medium.

6. The ink jet recording method according to claim 1,
wherein the recording medium is a recording medium having non-ink absorbability or a recording medium having low ink absorbability.

7. The ink jet recording method according to claim 1,
wherein the nozzle port is formed on a nozzle formation plate formed of silicon single crystal.

8. The ink jet recording method according to claim 1,
wherein the nozzle port has a nozzle density of equal to or greater than 300 dpi, and discharges the ink composition by a piezo method.

9. The ink jet recording method according to claim 1,
wherein the step is within a range where a distance in a direction from the nozzle port to the pressure chamber is in a range of 20 µm to 100 µm.

10. A method of controlling an ink jet recording apparatus, the method comprising:
controlling an ink jet recording apparatus to perform recording by the ink jet recording method according to claim 1 for one hour or more without cleaning performed by discharging the ink composition from the ink jet head by an action from the outside of the ink jet head.

11. A method of controlling an ink jet recording apparatus, the method comprising:
controlling an ink jet recording apparatus to perform recording by the ink jet recording method according to claim 2 for one hour or more without cleaning performed by discharging the ink composition from the ink jet head by an action from the outside of the ink jet head.

12. A method of controlling an ink jet recording apparatus, the method comprising:
controlling an ink jet recording apparatus to perform recording by the ink jet recording method according to claim 3 for one hour or more without cleaning performed by discharging the ink composition from the ink jet head by an action from the outside of the ink jet head.

13. A method of controlling an ink jet recording apparatus, the method comprising:
controlling an ink jet recording apparatus to perform recording by the ink jet recording method according to claim 4 for one hour or more without cleaning performed by discharging the ink composition from the ink jet head by an action from the outside of the ink jet head.

14. A method of controlling an ink jet recording apparatus, the method comprising:
controlling an ink jet recording apparatus to perform recording by the ink jet recording method according to claim 5 for one hour or more without cleaning performed by discharging the ink composition from the ink jet head by an action from the outside of the ink jet head.

15. A method of controlling an ink jet recording apparatus, the method comprising:
controlling an ink jet recording apparatus to perform recording by the ink jet recording method according to claim 6 for one hour or more without cleaning performed by discharging the ink composition from the ink jet head by an action from the outside of the ink jet head.

16. A method of controlling an ink jet recording apparatus, the method comprising:
controlling an ink jet recording apparatus to perform recording by the ink jet recording method according to claim 7 for one hour or more without cleaning performed by discharging the ink composition from the ink jet head by an action from the outside of the ink jet head.

17. A method of controlling an ink jet recording apparatus, the method comprising:
controlling an ink jet recording apparatus to perform recording by the ink jet recording method according to claim 8 for one hour or more without cleaning by discharging the ink composition from the ink jet head by an action from the outside of the ink jet head.

18. A method of controlling an ink jet recording apparatus, the method comprising:
controlling an ink jet recording apparatus to perform recording by the ink jet recording method according to claim 9 for one hour or more without cleaning by discharging the ink composition from the ink jet head by an action from the outside of the ink jet head.

* * * * *